US012538188B2

(12) United States Patent
Sood

(10) Patent No.: US 12,538,188 B2
(45) Date of Patent: Jan. 27, 2026

(54) INTERWORKING BETWEEN FIFTH GENERATION CORE (5GC) AND EVOLVED PACKET CORE (EPC) IN WIRELESS COMMUNICATION NETWORKS

(71) Applicant: T-MOBILE INNOVATIONS LLC, Overland Park, KS (US)

(72) Inventor: Romil Kumar Sood, Bothell, WA (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 317 days.

(21) Appl. No.: 18/474,675

(22) Filed: Sep. 26, 2023

(65) Prior Publication Data

US 2025/0106697 A1   Mar. 27, 2025

(51) Int. Cl.
*H04W 36/00* (2009.01)
*H04W 12/06* (2021.01)
*H04W 60/00* (2009.01)

(52) U.S. Cl.
CPC ..... *H04W 36/00222* (2023.05); *H04W 12/06* (2013.01); *H04W 60/00* (2013.01)

(58) Field of Classification Search
CPC .. H04W 36/00222; H04W 12/06; H04W 8/06
See application file for complete search history.

(56) References Cited

U.S. PATENT DOCUMENTS

| | | | |
|---|---|---|---|
| 10,524,166 B2 | 12/2019 | Youn et al. | |
| 11,012,857 B1* | 5/2021 | Malhotra | H04W 8/08 |
| 11,026,128 B2 | 6/2021 | Faccin et al. | |
| 11,064,383 B2 | 7/2021 | Karri et al. | |
| 11,128,985 B2 | 9/2021 | Edge et al. | |
| 11,159,991 B2* | 10/2021 | Lu | H04W 76/27 |
| 2021/0153087 A1 | 5/2021 | Lee et al. | |
| 2022/0030428 A1* | 1/2022 | Li | H04W 12/69 |

* cited by examiner

Primary Examiner — Brandon J Miller

(57) ABSTRACT

Various embodiments comprise a Fifth Generation (5G) visited wireless communication network to interwork with a Long Term Evolution (LTE) home network. In some examples, the 5G visited wireless communication network comprises an Access and Mobility Management Function (AMF) and an Interworking Function (IWF). The AMF receives a service request from a 5G capable visiting user device. The AMF generates Fifth Generation Core (5GC) authentication signaling to authenticate the visiting user device. Prior to delivering the 5GC authentication signaling to the home network, the IWF translates the 5GC authentication signaling into Evolved Packet Core (EPC) authentication signaling and transfers the EPC authentication signaling to the home network. The IWF receives an EPC authentication response from the home network and translates the EPC authentication response into a 5GC authentication response. The AMF authenticates the visiting user device for service on the 5G visited wireless communication network based on the 5GC authentication response.

20 Claims, 12 Drawing Sheets

INTERWORKING BETWEEN FIFTH GENERATION CORE (5GC) AND EVOLVED PACKET CORE (EPC) IN WIRELESS COMMUNICATION NETWORKS

TECHNICAL FIELD

Various embodiments of the present technology relate to User Equipment (UE) roaming, and more specifically, to interworking between Fifth Generation Stand Alone (5G SA) networks and Long Term Evolution (LTE) networks.

BACKGROUND

Wireless communication networks provide wireless data services to wireless user devices. Exemplary wireless data services include voice calling, video calling, internet-access, media-streaming, online gaming, social-networking, and machine-control. Exemplary wireless user devices comprise phones, computers, vehicles, robots, and sensors. Radio Access Networks (RANs) exchange wireless signals with the wireless user devices over radio frequency bands. The wireless signals use wireless network protocols like Fifth Generation New Radio (5GNR), Long Term Evolution (LTE), Institute of Electrical and Electronic Engineers (IEEE) 802.11 (WIFI), and Low-Power Wide Area Network (LP-WAN). The RANs exchange network signaling and user data with network elements that are often clustered together into wireless network cores over backhaul data links. The core networks execute network functions to provide wireless data services to the wireless user devices.

When a user device is out of the service area provided by its home network, the user device may attach and receive service over another wireless communication network in a process referred to as roaming. When roaming, the user device is referred to as a visiting user device and the network it is roaming on is referred to as the visited network. The visited and home networks exchange signaling and subscriber data for the visiting user device to register the user device on the visited network and define the level of service to be provided to the user device. Once registered, the user device exchanges user data with the visited network. The visited network forwards the user data to the home network of the user device. The home network exchanges the user data with external systems.

Radio Access Technologies (RATs) and network capabilities vary between different wireless communication networks. Some networks comprise Fifth Generation Stand Alone (5G SA) networks while other networks only provide Long Term Evolution (LTE) service. The signaling protocols used in 5G SA networks are different than the signaling protocols used in LTE networks. This signaling difference inhibits 5G SA networks from effectively communicating with LTE networks. The lack of effective communication negatively impacts the user experience in roaming scenarios.

Unfortunately, 5G SA wireless communication networks do not efficiently communicate with LTE networks. Moreover, the 5G SA wireless communication networks do not effectively support roaming for devices from an LTE home network.

OVERVIEW

This Overview is provided to introduce a selection of concepts in a simplified form that are further described below in the Technical Description. This summary is not intended to identify key features or essential features of the claimed subject matter, nor is it intended to be used as an aid in determining the scope of the claimed subject matter.

Various embodiments of the present technology relate to solutions for User Equipment (UE) roaming. Some embodiments comprise a method of operating a Fifth Generation (5G) visited wireless communication network to interwork with a Long Term Evolution (LTE) home network. The method comprises receiving a service request from a 5G capable visiting user device, the home network of the visiting user device comprising an Evolved Packet Core (EPC) network architecture. The method further comprises generating Fifth Generation Core (5GC) authentication signaling to authenticate the visiting user device. The method further comprises, prior to delivering the 5GC authentication signaling to the home network, translating the 5GC authentication signaling into EPC authentication signaling. The method further comprises transferring the EPC authentication signaling for delivery to the home network. The method further comprises receiving an EPC authentication response from the home network. The method further comprises translating the EPC authentication response into a 5GC authentication response. The method further comprises authenticating the visiting user device for service on the 5G visited wireless communication network based on the 5GC authentication response.

Some embodiments comprise a 5G visited wireless communication network to interwork with an LTE home network. The 5G visited wireless communication network comprises Access and Mobility Management Function (AMF) circuitry and Fifth Generation Core/Evolved Packet Core Interworking Function (5EIWF) circuitry. The AMF circuitry receives a service request from a 5G capable visiting user device. The home network of the visiting user device comprises an EPC network architecture. The AMF circuitry generates 5GC authentication signaling to authenticate the visiting user device. Prior to delivering the 5GC authentication signaling to the home network, the 5EIWF circuitry translates the 5GC authentication signaling into EPC authentication signaling. The 5EIWF circuitry transfers the EPC authentication signaling for delivery to the home network. The 5EIWF circuitry receives an EPC authentication response from the home network. The 5EIWF circuitry translates the EPC authentication response into a 5GC authentication response. The AMF circuitry authenticates the visiting user device for service on the 5G visited wireless communication network based on the 5GC authentication response.

Some embodiments comprise one or more non-transitory computer-readable storage media having program instructions stored thereon to interwork with an LTE home network. When executed by a computing system, the program instructions direct the computing system to perform operations. The operations comprise receiving a service request from a 5G capable visiting user device for service on a 5G visited wireless communication network, the home network of the visiting user device comprising an EPC network architecture. The operations further comprise generating 5GC authentication signaling to authenticate the visiting user device. The operations further comprise, prior to delivering the 5GC authentication signaling to the home network, translating the 5GC authentication signaling into EPC authentication signaling. The operations further comprise transferring the EPC authentication signaling for delivery to the home network. The operations further comprise receiving an EPC authentication response from the home network. The operations further comprise translating the EPC authentication response into a 5GC authentication response. The operations further comprise authenticating the visiting user device for service on the 5G visited wireless communication network based on the 5GC authentication response.

DESCRIPTION OF THE DRAWINGS

Many aspects of the disclosure can be better understood with reference to the following drawings. The components in the drawings are not necessarily drawn to scale. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

Figure 1:
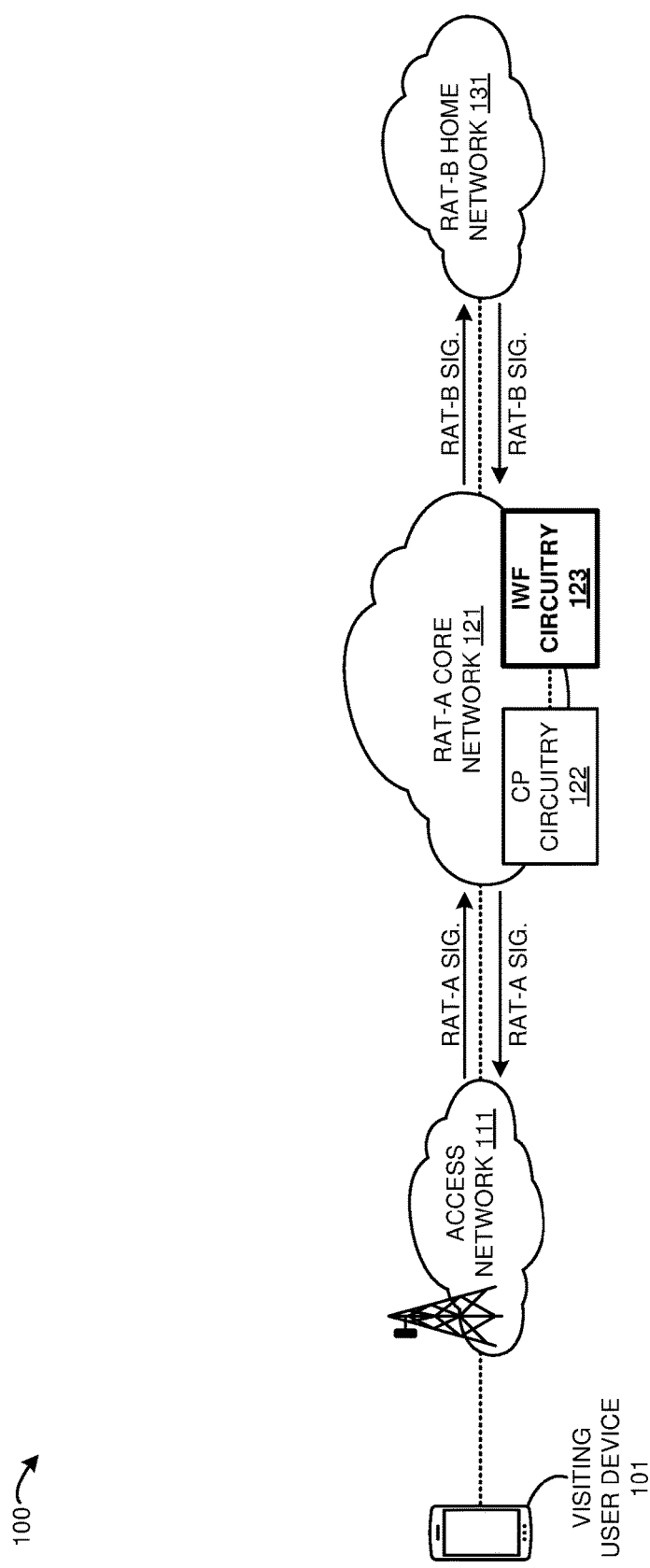
FIG. 1 illustrates a data network of a first a first Radio Access Technology (RAT) type to interwork with a home network of a second RAT type.

The drawings have not necessarily been drawn to scale. Similarly, some components or operations may not be separated into different blocks or combined into a single block for the purposes of discussion of some of the embodiments of the present technology. Moreover, while the technology is amendable to various modifications and alternative forms, specific embodiments have been shown by way of example in the drawings and are described in detail below. The intention, however, is not to limit the technology to the particular embodiments described. On the contrary, the technology is intended to cover all modifications, equivalents, and alternatives falling within the scope of the technology as defined by the appended claims.

Technical Description

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

FIG. 1 illustrates data network 100 network of a first Radio Access Technology (RAT) type to interwork with a home network of a second RAT type. Data network 100 delivers services like voice calling machine communications, internet-access, media-streaming, or some other wireless communications product to user devices. Data network 100 comprises visiting user device 101, access network 111, and RAT-A core network 121. RAT-A core network 121 comprises control plane (CP) circuitry 122 and Interworking Function (IWF) circuitry 123. FIG. 1 also illustrates RAT-B home network 131. In other examples, data network 100 may comprise additional or different elements than those illustrated in FIG. 1.

Various examples of network operation and configuration are described herein. In some examples, visiting user device 101 is roaming on data network 101. The home network of visiting user device 101 is RAT-B home network 131. Typically, user devices roam when they are out of the coverage area of their home network. Data network 100 and RAT-B home network 131 comprise different RAT types. For example, data network 100 may comprise a Fifth Generation Stand Alone (5G SA) network while home network 131 may comprise a Long Term Evolution (LTE) network. It should be appreciated that the difference in RAT types results in different core network architectures between data network 100 and home network 131. For example, core network 121 may comprise a Fifth Generation Core (5GC) architecture while the core network of home network 131 may comprise an Evolved Packet Core (EPC) architecture. Visiting user device 101 comprises capabilities for both RAT-A provided by data network 100 and RAT-B provided by home network 131.

Visiting user device 101 transfers a request to RAT-A core network 121 for service on data network 100 over access network 111 in RAT-A signaling. Control plane circuitry 122 generates RAT-A signaling for RAT-B home network 131 to approve user device 101 for service on data network 100. IWF circuitry 123 translates the RAT-A signaling generated by control plane circuitry 122 into RAT-B signaling interpretable by RAT-B home network 131. IWF circuitry 123 transfers the RAT-B signaling to home network 131. Home network 131 approves visiting user device 101 for service on data network 100 and transfers RAT-B response signaling to RAT-A core network 121. The response signaling include metrics like authentication and registration data, service attributes, policy data, session approvals, and/or other types of information that approve user device for service and define the level of service to be provided to user device 101 on network 100. IWF circuitry 123 receives the RAT-B response signaling and translates the RAT-B signaling into RAT-A response signaling interpretable by data network 100. Control plane 122 organizes the network elements of RAT-A network core 121 to serve user device 101 based on the response signaling provided by home network 131. Control plane 122 generates a RAT-A signaling approving user device 101 for service on data network 100 and transfers the RAT-A signaling to user device 101 over access network 111.

User device 101 is representative of a wireless user device. Exemplary user devices include phones, computers, vehicles, drones, robots, sensors, and/or other devices with wireless communication capabilities. Access network 111 exchanges wireless signals with user device 101 over radio frequency bands. The radio frequency bands use wireless network protocols like Fifth Generation New Radio (5GNR), Long Term Evolution (LTE), Institute of Electrical and Electronic Engineers (IEEE) 802.11 (WIFI), and Low-Power Wide Area Network (LP-WAN). Access network 111 is connected to core network 121 over backhaul data links. Access network 111 exchanges network signaling and user data with network elements in core network 121. Access network 111 may comprise wireless access points, Radio Access Networks (RANs), internet backbone providers, edge computing systems, or other types of wireless/wireline access systems to provide wireless links to user device 101, the backhaul links to core network 121, and the edge computing services between user device 101 and core network 121.

Access network 111 comprises wireless access nodes to serve user device 101. The access nodes may comprise Radio Units (RUs), Distributed Units (DUs) and Centralized Units (CUs). The RUs may be mounted at elevation and have antennas, modulators, signal processors, and the like. The RUs are connected to the DUs which are usually nearby network computers. The DUs handle lower wireless network layers like the Physical Layer (PHY), Media Access Control (MAC), and Radio Link Control (RLC). The DUs are connected to the CUs which are larger computer centers that are closer to core network 121. The CUs handle higher wireless network layers like the Radio Resource Control (RRC), Service Data Adaption Protocol (SDAP), and Packet Data Convergence Protocol (PDCP). The CUs are coupled to network functions in core network 121.

RAT-A core network 121 is representative of computing systems that provide wireless data services to user device 101 over access network 111. Exemplary computing systems comprise Network Function Virtualization (NFVI) systems, data centers, server farms, cloud computing networks, hybrid cloud networks, and the like. The computing systems of core network 121 store and execute the network functions to form control plane circuitry 122 and IWF circuitry 123. Control plane circuitry 122 provides wireless data services to user device 101 over access network 111. IWF circuitry 123 translates RAT-A signaling and RAT-B signaling between RAT-A core network 121 and RAT-B home network 131. Control plane 122 may comprise network functions like Access and Mobility Management Function (AMF), Mobility Management Entity (MME), Session Management Function (SMF), Policy Control Function (PCF), Policy and Charging Rules Function (PCRF), Unified Data Management (UDM), Home Subscriber Server (HSS), Network Slice Selection Function (NSSF), and the like. The computing systems of core network 121 typically store and execute other network functions to form a user plane (not illustrated) to support user data exchange over network 121. The user plane typically comprises network functions like User Plane Function (UPF), Packet Gateway (P-GW), Session Gateway (S-GW), and the like. Core network 121 may comprise a 5GC architecture, an EPC architecture, and/or another RAT type core network architecture.

Figure 2:
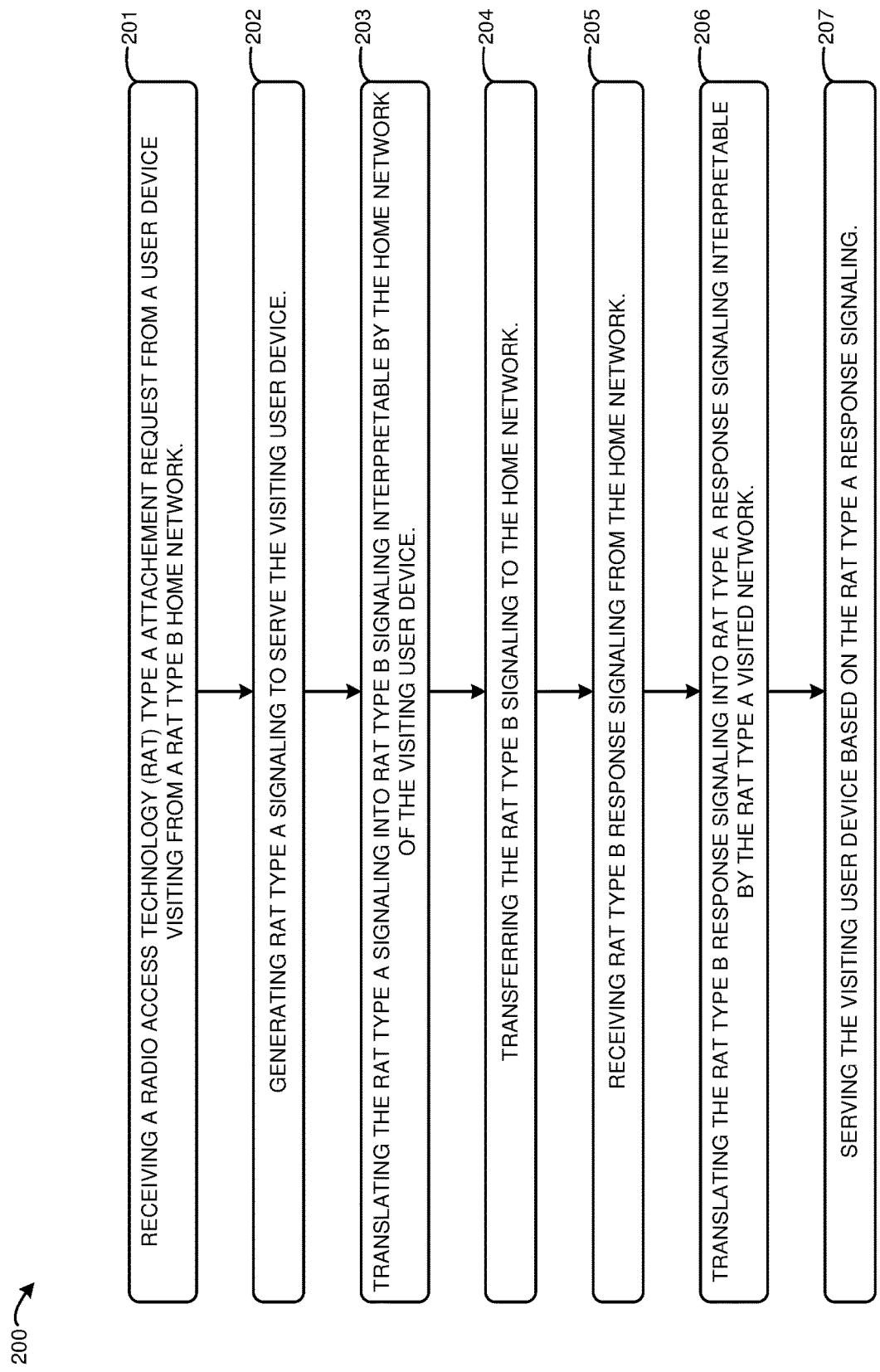
FIG. 2 illustrates an exemplary operation of the data network of the first RAT type to interwork with the home network of the second RAT type.

FIG. 2 illustrates process 200. Process 200 comprises an exemplary operation of RAT type A data network 100 to interwork with RAT type B home network. The operation may vary in other examples. The operations of process 200 comprise receiving a RAT type A attachment request from a user device visiting from a RAT type B home network (step 201). The operations further comprise generating RAT type A signaling to serve the visiting user device (step 202). The operations further comprise translating the RAT type A signaling into RAT type B signaling interpretable by the home network of the visiting user device (step 203). The operations further comprise transferring the RAT type B signaling to the home network (step 204). The operations further comprise receiving RAT type B response signaling from the home network (step 205). The operations further comprise translating the RAT type B response signaling into RAT type A response signaling interpretable by the RAT type A visited network (step 206). The operations further comprise serving the visiting user device based on the RAT type A response signaling (step 207).

Figure 3:
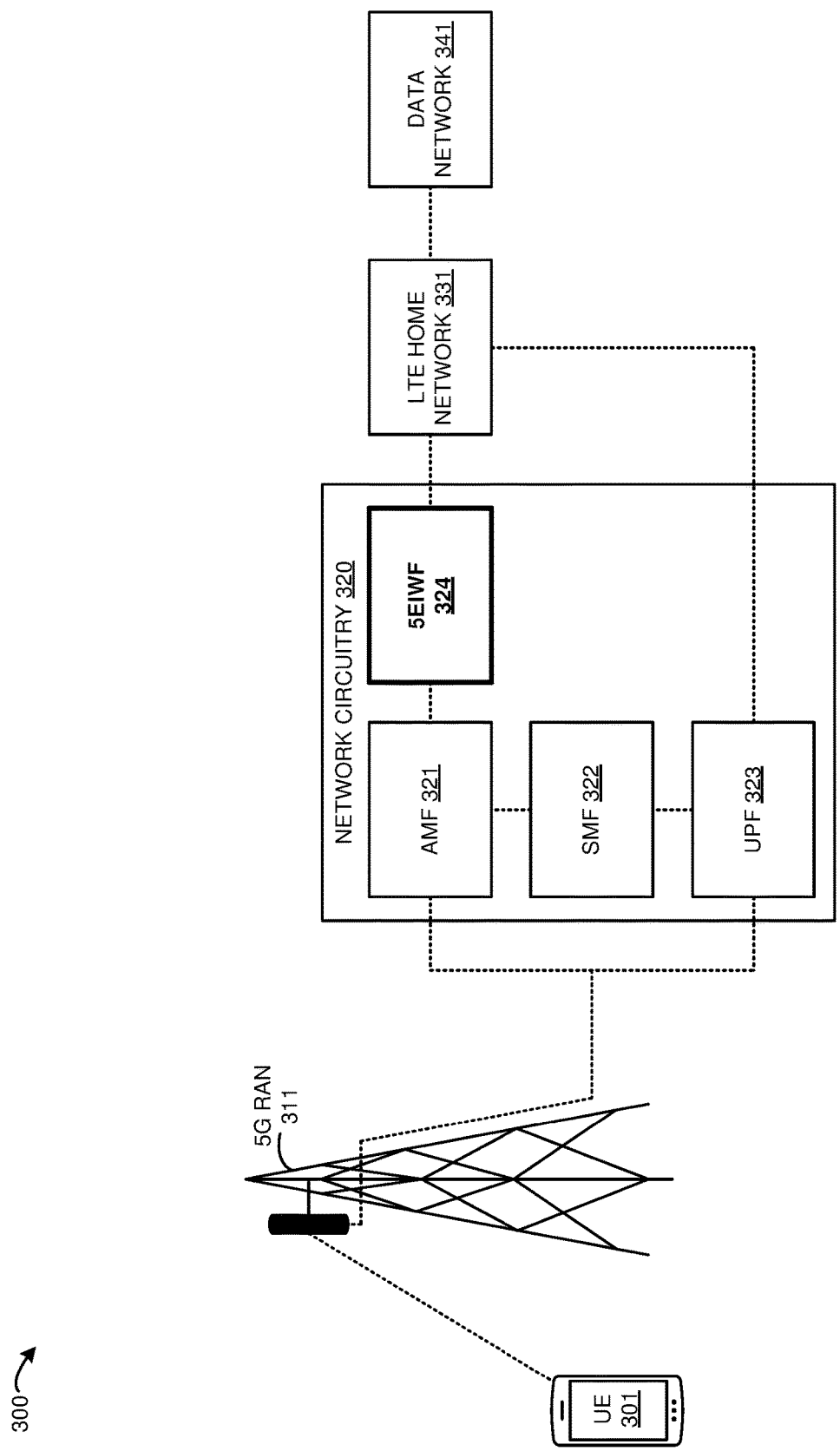
FIG. 3 illustrates a Fifth Generation (5G) visited wireless communication network to interwork with a Long Term Evolution (LTE) home network.

FIG. 3 illustrates 5G visited wireless communication network 300 to interwork with an LTE home network. Wireless communication network 300 is an example of data network 100, however network 100 may differ. Wireless communication network 300 comprises UE 301, 5G RAN 311, and network circuitry 320. Network circuitry 320 comprises AMF 321, SMF 322, UPF 323, and 5GC/EPC Interworking Function (5EIWF) 324. FIG. 3 also illustrates LTE home network 331 and data network 341. In other examples, wireless network 300 may comprise additional or different elements than those illustrated in FIG. 3.

In some examples, AMF 321 receives a service request from UE 301. The service request indicates that UE 301 is roaming on network 300 and that the home network of UE 301 is LTE home network 331. Home network 331 of UE 331 comprises an EPC network architecture while network circuitry 320 comprises a 5GC network architecture. Before UE 301 can receive service on visited network 300, the identity of UE 301 should first be authenticated. However, since UE 301 is visiting on network 300, network circuitry 320 does not comprise the required information to verify the identity of UE 301 and therefore should interface with LTE home network 331 to authenticate UE 301. AMF 321 generates 5GC authentication signaling to authenticate UE 301. It should be appreciated that since network circuitry 320 and LTE home network 331 use different network architectures, the signaling types used in the respective networks are incompatible. Prior to delivering the 5GC authentication signaling to LTE home network 331, 5EIWF 324 translates the 5GC authentication signaling into EPC authentication signaling. 5EIWF 324 transfers the EPC authentication signaling for delivery to LTE home network 331. Subsequently, 5EIWF 324 receives an EPC authentication response from LTE home network 331. For example, LTE home network 331 may retrieve authentication vectors to verify the identity of UE 301 and transfer the authentication vectors to 5EIWF 324 in EPC signaling. 5EIWF 324 translates the EPC authentication response into a 5GC authentication response and indicates the authentication response to AMF 321. AMF 321 authenticates UE 301 for service on 5G visited wireless communication network 300 based on the 5GC authentication response. For example, AMF 321 may transfer an authentication challenge to UE 301 over RAN 311. UE 301 may then generate an authentication response and return the response to AMF 321. AMF 321 may then compare the authentication response generated by UE 301 to the authentication data provided by LTE home network 331 to verify the identity of UE 301.

Advantageously, wireless communication network 300 effectively communicates with LTE home network 331 to support roaming devices from LTE home network 331. Moreover, wireless communication network 300 efficiently translates 5GC signaling into corresponding EPC signaling and vice versa to authenticate visiting UE 301 for service on network 300.

UE 301 and RAN 311 communicate over links using wireless technologies like 5GNR, LTE, LP-WAN, WIFI, Bluetooth, and/or some other type of wireless networking protocol. The wireless technologies use electromagnetic frequencies in the low-band, mid-band, high-band, or some other portion of the electromagnetic spectrum. RAN 311, network circuitry 320, LTE home network 331, and data network 341 communicate over various links that use metallic links, glass fibers, radio channels, or some other communication media. The links use Fifth Generation Core (5GC), IEEE 802.3 (ENET), Time Division Multiplex (TDM), Data Over Cable System Interface Specification (DOCSIS), Internet Protocol (IP), General Packet Radio Service Transfer Protocol (GTP), 5GNR, LTE, WIFI, virtual switching, inter-processor communication, bus interfaces, and/or some other data communication protocols.

UE 301 may comprise a phone, vehicle, computer, sensor, drone, robot, or another type of data appliance with wireless communication circuitry. Although RAN 311 is illustrated as a tower, RAN 311 may comprise another type of mounting structure (e.g., buildings), or no mounting structure at all. RAN 311 comprises a 5G RAN, gNodeB, NB-IoT access node, LP-WAN base station, wireless relay, WIFI hotspot, Bluetooth access node, and/or another type of wireless network transceiver. UE 301 and RAN 311 comprise antennas, amplifiers, filters, modulation, analog/digital interfaces, microprocessors, software, memories, transceivers, bus circuitry, and the like. LTE home network 331 comprises EPC network elements like MME, P-GW, S-GW, HSS, and the like. Data network 341 comprises elements like Application Server (AS) and the like.

UE 301, RAN 311, network circuitry 320, LTE home network 331, and data network 341 comprise microprocessors, software, memories, transceivers, bus circuitry, and the like. The microprocessors comprise Digital Signal Processors (DSP), Central Processing Units (CPU), Graphical Processing Units (GPU), Application-Specific Integrated Circuits (ASIC), Field Programmable Gate Array (FPGA), and/or the like. The memories comprise Random Access Memory (RAM), flash circuitry, Solid State Drives (SSD), Non-Volatile Memory Express (NVMe) SSDs, Hard Disk Drives (HDDs), and/or the like. The memories store software like operating systems, user applications, radio applications, network functions, and multimedia functions. The microprocessors retrieve the software from the memories and execute the software to drive the operation of 5G wireless communication network 300 as described herein.

Figure 4:
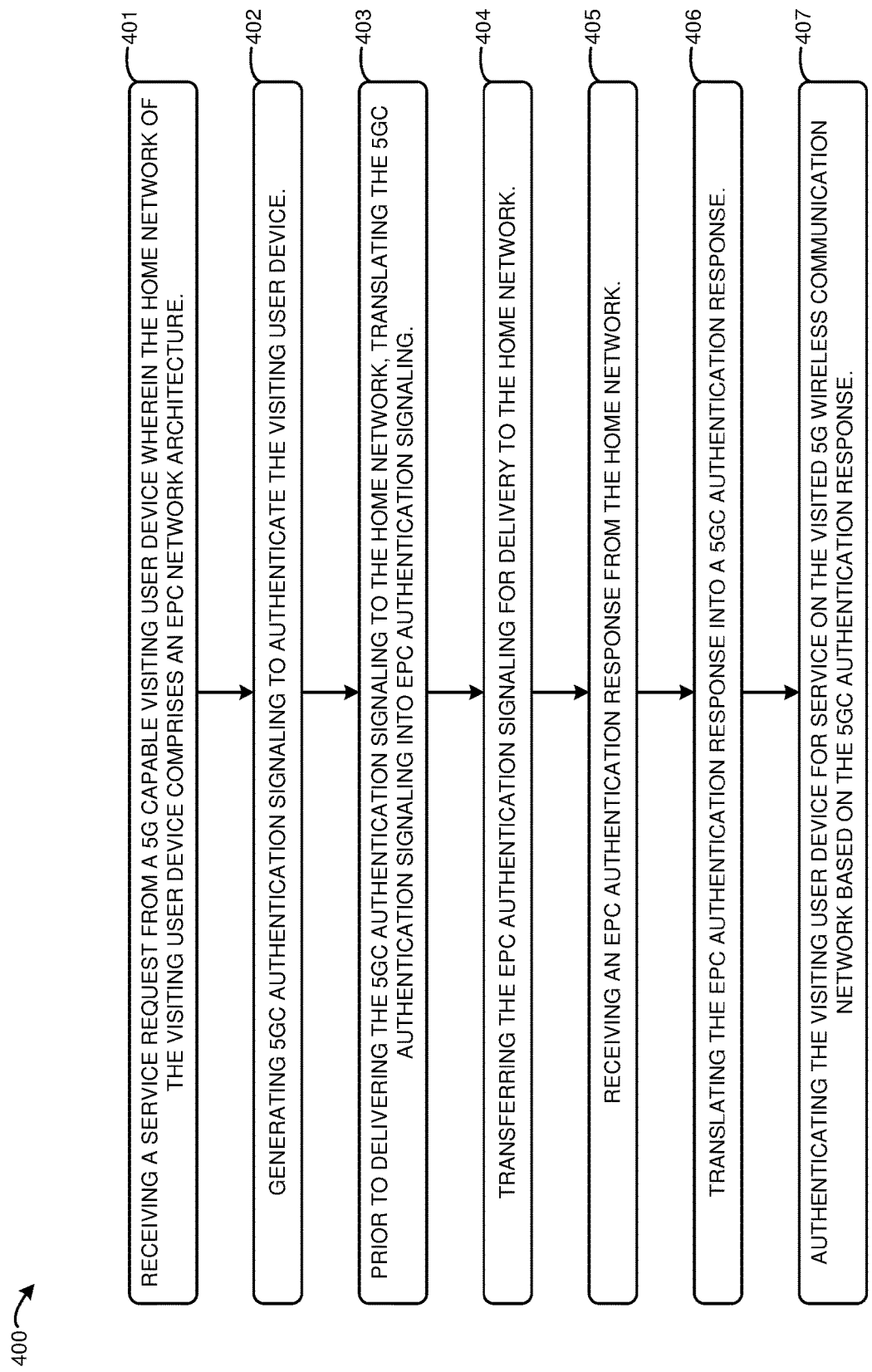
FIG. 4 illustrates an exemplary operation of the 5G visited wireless communication network to interwork with the LTE home network.

FIG. 4 illustrates process 400. Process 400 comprises an exemplary operation of 5G visited wireless communication network 300 to interwork with an LTE home network. Process 400 comprises an example of process 200 illustrated in FIG. 2, however process 200 may differ. The operation may vary in other examples. The operations of process 400 comprise receiving a service request from a 5G capable visiting user device wherein the home network of the visiting user device comprises an EPC network architecture (step 401). The operations further comprise generating 5GC authentication signaling to authenticate the visiting user device (step 402). The operations further comprise, prior to delivering the 5GC authentication signaling to the home network, translating the 5GC authentication signaling into EPC authentication signaling (step 403). The operations further comprise transferring the EPC authentication signaling for delivery to the home network (step 404). The operations further comprise receiving an EPC authentication response from the home network (step 405). The operations further comprise translating the EPC authentication response into a 5GC authentication response (step 406). The operations further comprise authenticating the visiting user device for service on the visited 5G wireless communication network based on the 5GC authentication response (step 407).

Figure 5:
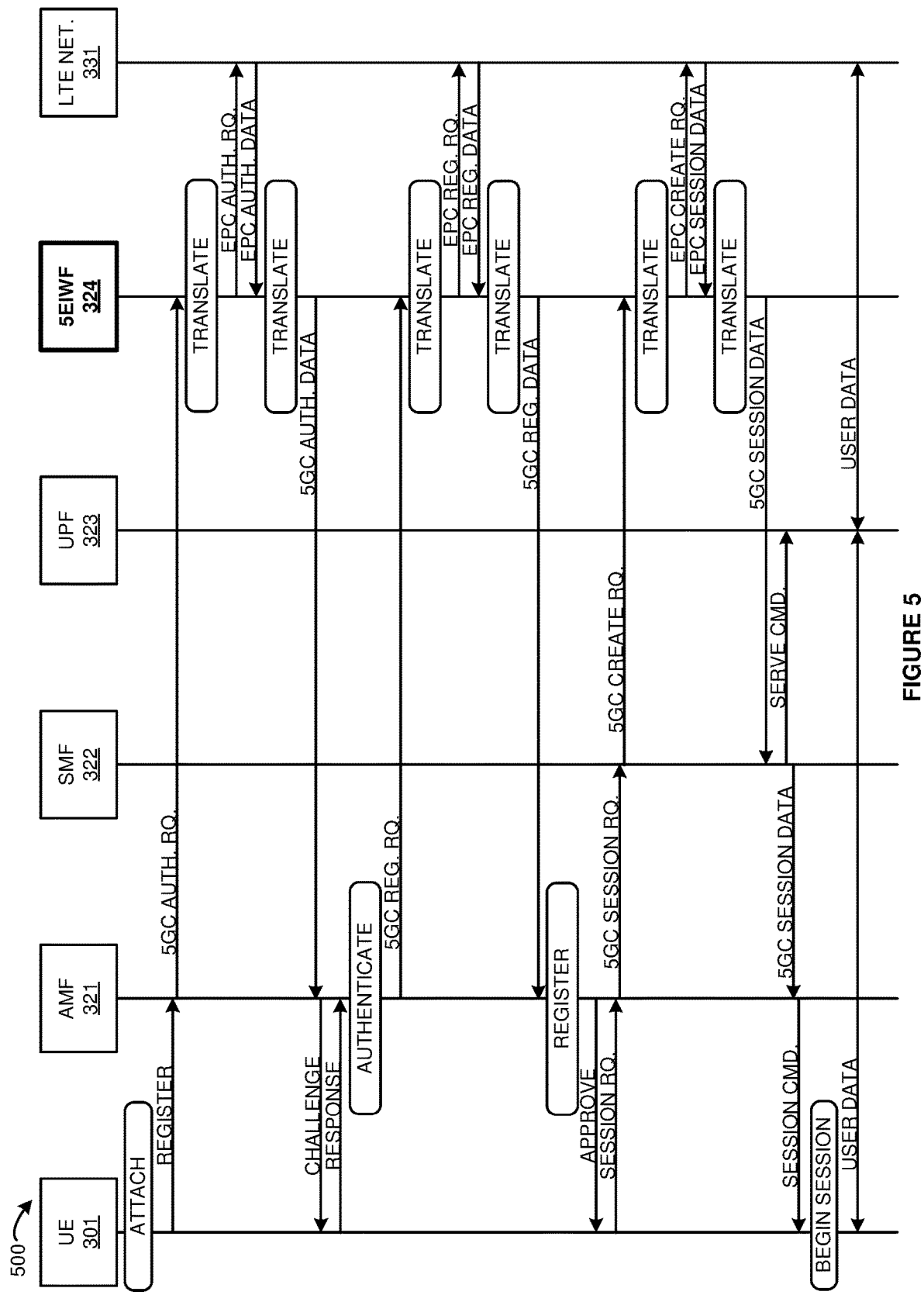
FIG. 5 illustrates an exemplary operation of the 5G visited wireless communication network to interwork with the LTE home network.

FIG. 5 illustrates process 500. Process 500 comprises an exemplary operation of 5G visited wireless communication network 300 to interwork with an LTE home network. Process 500 comprises an example of process 200 illustrated in FIG. 2 and process 400 illustrated in FIG. 4, however processes 200 and 400 may differ. In some examples, UE 301 detects that it is out of the coverage area provided by home network 331 and decides to roam on network 300. UE 301 attaches to RAN 311 and transfers a registration request to AMF 321. The registration request indicates the home Public Land Mobile Network (PLMN) of UE 301 is LTE network 331.

AMF 321 receives the registration request and determines that UE 301 is visiting from LTE network 331. AMF 321 generates a 5GC authentication request (AUTH. RQ.) that identifies UE 301 and transfers the authentication request for delivery to LTE network 331. Before the request is delivered to LTE network 331, 5EIWF 324 receives and translates the 5GC authentication request into an EPC authentication request. For example, 5EIWF 324 may convert 5GC N32 registration signaling generated by AMF 321 into EPC s6a signaling for LTE network 331. 5EIWF 524 transfers the translated authentication request to LTE network 331. LTE network 331 receives the request and retrieves authentication data for UE 301. For example, an MME resident in the core of LTE network 331 may interface with a HSS resident in the core of LTE network 331 to retrieve authentication data like an authentication challenge, key selection criteria, a random number, and the like. LTE network 331 transfers EPC authentication data (AUTH. DATA) for UE 301 to 5EIWF 324. 5EIWF 324 receives and translates the EPC authentication data into 5GC authentication data. For example, 5EIWF 324 may convert EPC s6a signaling from LTE network 331 into 5GC N32 registration signaling for AMF 321. 5EIWF 524 transfers the translated authentication data to AMF 321.

AMF 621 transfers an authentication challenge to UE 301 to verify the identity of UE 301. The challenge may comprise a random number, key selection information, and the like. UE 301 generates a challenge response and returns the response to AMF 621. AMF 621 compares the challenge response generated by UE 301 to the authentication data provided by LTE network 331 to authenticate UE 301. In response to authenticating UE 301, AMF 621 generates a 5GC registration request (REG. RQ.) to retrieve registration and subscription data for UE 301 from LTE network 331. AMF 621 transfers the 5GC registration request to 5EIWF 324. 5EIWF 324 translates the 5GC registration request into an EPC registration request and delivers the EPC registration request to LTE network 331. LTE network 331 retrieves the requested registration data for UE 301 and transfers EPC registration data to 5EIWF 324. For example, an MME resident in the core of LTE network 331 may interface with a HSS resident in the core of LTE network 331 to retrieve registration data like supported features, subscription data, a Permanent Equipment Identifier (PEI) for UE 301, session information, and the like. 5EIWF 324 receives and translates the EPC registration data into 5GC registration data and transfers the 5GC authentication data to AMF 321. AMF 321 registers UE 301 for service on network 300 based on the registration data provided by LTE network 331. AMF 321 transfers a registration approval message to UE 301 over RAN 311. The approval message comprises service authorizations, Quality-of-Service (QoS) metrics, and/or other information for UE 301 to begin sessions on network 300.

In response to a user input, a user application executes in UE 301. UE 301 generates a session request (SESSION RQ.) for the user application and transfers the request to AMF 321 which then notifies SMF 322. SMF 322 generates a 5GC create session request (CREATE RQ.) for UE 301 and transfers the request to 5EIWF 324. 5EIWF 324 translates the 5GC create session request into and EPC create session request and transfers the request to LTE network 331. LTE network 331 organizes the LTE network entities to serve UE 301 and retrieves session data for the requested session. LTE network 331 transfers the EPC session data to 5EIWF 324. For example, a P-GW resident in LTE network 331 may identify the network addresses of the network entities in LTE network 331 that are to serve UE 301 and indicate the addresses to 5EIWF 324 as session data. 5EIWF translates the EPC session data into 5GC session data and transfers the translated data to SMF 322. SMF 322 forwards the session data to AMF 321 and transfers a serve command (SERVE CMD.) to UPF 323 to serve UE 301. AMF 321 transfers a session command (SESSION CMD.) that directs UE 301 to begin the session and that comprises the data received from LTE network 331. UE 301 receives the session command and responsively begins the data session. UE 301 exchanges user data for the session with UPF 623 over RAN 311. UPF 623 exchanges the user data LTE network 331. LTE network 331 exchanges the user data with data network 341. Although the above example is given in the context of establishing a data session for a visiting user device, in other examples, network 300 may instead establish a multimedia session like a voice call, video call, Rich Communication Service (RCS) session, or other type of multimedia session for UE 301.

Figure 6:
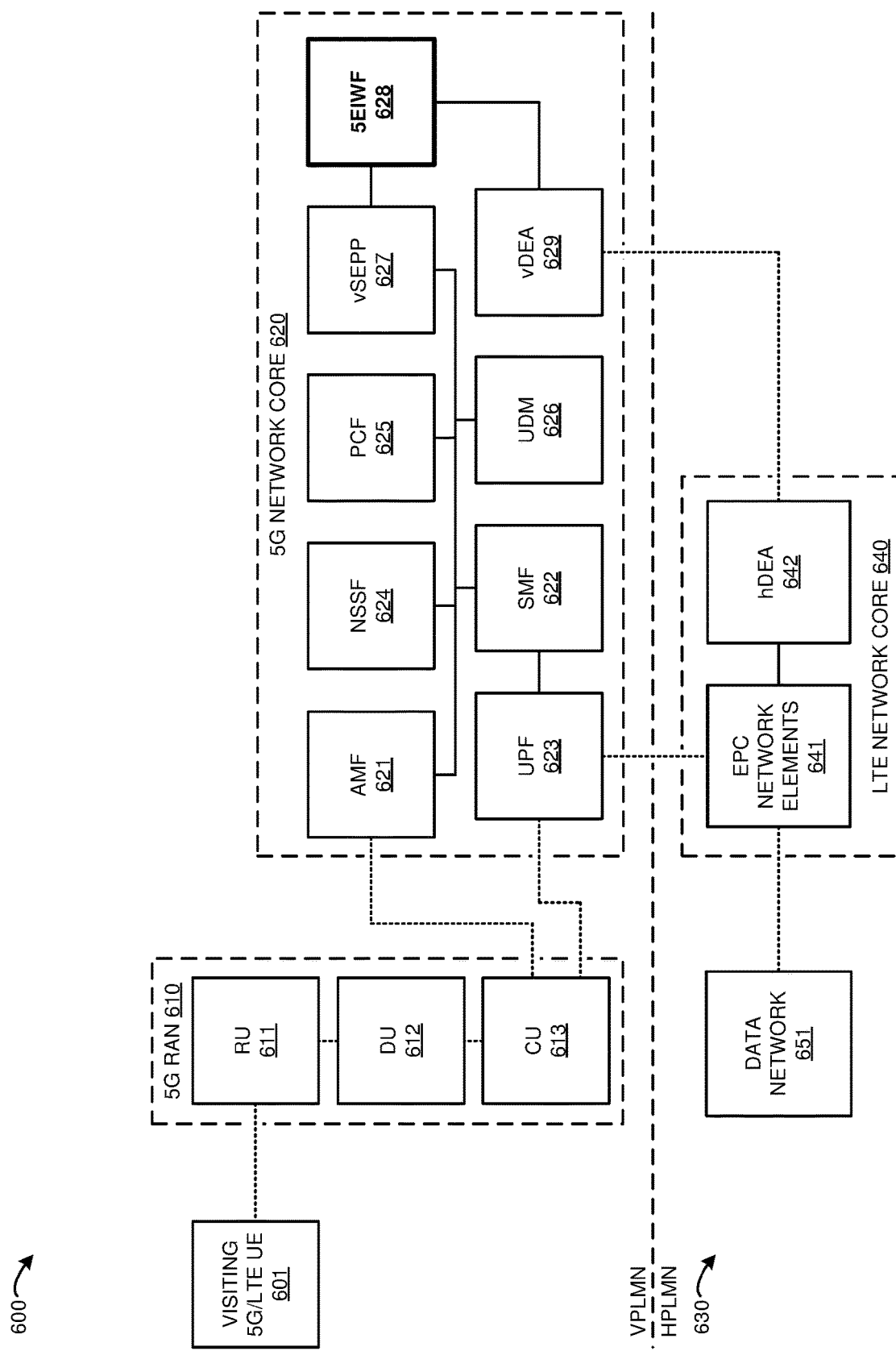
FIG. 6 illustrates a 5G visited wireless communication network to interwork between Fifth Generation Core (5GC) network elements and an Evolved Packet Core (EPC) home network.

FIG. 6 illustrates 5G visited communication network 600 to interwork between 5GC network elements and an EPC home network. FIG. 6 also illustrates home LTE communication network 630. As illustrated in FIG. 6, 5G communication network 600 comprises the Visited PLMN (VPLMN) for UE 601 while LTE network 630 comprises the Home PLMN (HPLMN) for UE 601. 5G communication network 600 comprises an example of data network 100 illustrated in FIG. 1 and wireless communication network 300 illustrated in FIG. 3, however networks 100 and 300 may differ. 5G Communication network 600 comprises visiting 5G/LTE UE 601, 5G RAN 610, and 5G network core 620. 5G RAN 610 comprises Radio Unit (RU) 611, Distributed Unit (DU) 612, and Centralized Unit (CU) 613. 5G network core 620 comprises Access and Mobility Management Function (AMF) 621, Session Management Function (SMF) 622, User Plane Function (UPF) 623, Network Slice Selection Function (NSSF) 624, Policy Control Function (PCF) 625, Unified Data Management (UDM) 626, Visited Security Edge Protection Proxy (vSEPP) 627, 5GC/EPC Interworking Function (5EIWF) 628, and Visited Diameter Edge Agent (vDEA) 629. Other network functions and network entities like Network Repository Function (NRF), Session Communication Proxy (SCP), Network Exposure Function (NEF), and Application Function (AF) are typically present in 5G network core 620 but are omitted for clarity. Home LTE communication network 630 comprises LTE network core 640 and data network 651. LTE network core 640 comprises EPC network elements 641 and Home DEA (hDEA) 642. EPC network elements 631 comprise EPC entities like Mobility Management Entity (MME), Packet Gateway (P-GW), Serving Gateway (S-GW), Policy and Charging Rules Function (PCRF), Home Subscriber Server (HSS), and the like. In other examples, visiting 5G communication network 600 and home LTE communication network 601 may comprise different or additional elements than those illustrated in FIG. 6.

In some examples, 5G/LTE UE 601 detects that it is not in the coverage range of network 601 and decides to roam on network 600. UE 601 wirelessly attaches to RAN 610. UE 601 transfers a registration request to CU 613 over RU 611 and DU 612. The registration request includes information like a registration type, the HPLMN of UE 601, UE capabilities, requested slice types, Protocol Data Unit (PDU) session requests, and the like. CU 613 forwards the registration request for UE 601 to AMF 621. In response to the registration request, AMF 621 transfers an identity request to UE 601 over RAN 610. UE 601 indicates its Subscriber Concealed Identifier (SUCI) to CU 613 over RU 611 and DU 612. CU 613 forwards the SUCI to AMF 621. AMF 621 identifies that UE 601 is roaming on network 600 based on the HPLMN indication in the registration request. AMF 621 identifies that HPLMN ID of UE 601 corresponds to LTE network 630. In response, AMF 621 transfers a 5GC authentication request to authenticate UE 601 to vSEPP 627. The 5GC authentication request includes the SUCI of UE 601. vSEPP 627 approves and forwards the request to 5EIWF 628. 5EIWF 628 translates the 5GC authentication request into a corresponding EPC authentication request and transfers the request to EPC network elements 641 over vDEA 629 and hDEA 642.

EPC network elements 641 gather authentication vectors and the Subscriber Permanent Identifier (SUPI) for UE 601 based on the SUCI provided by UE 601. The vectors comprise an authentication challenge, key selection criteria, and a random number. For example, EPC network elements 641 may comprise an MME and an HSS. The MME may receive the EPC authentication request from 5EIWF 528 and retrieve authentication vectors for UE 601 from the HSS. The HSS may generate authentication vectors for UE 601 return the vectors and SUPI for UE 601 to the MME. For example, the HSS may retrieve a secret key from the subscriber profile of UE 601 and hash the random number with the secret key to generate an authentication challenge. EPC network elements 641 transfer EPC signaling that carries the SUPI and authentication vectors to 5EIWF 628 over hDEA 642 and vDEA 629.

5EIWF 628 translates the EPC signaling that carries the SUPI and authentication vectors into corresponding 5GC signaling. 5EIWF 628 transfers the corresponding 5GC signaling to vSEPP 627. vSEPP 627 screens the 5GC signaling for malicious/unwanted messages and transfers the 5GC signaling to AMF 621. AMF 621 reads the authentication vectors and SUPI for UE 601. AMF 621 indicates the authentication type and transfers the authentication challenge, key selection criteria, and random number to UE 601 over RAN 610. UE 601 hashes the random number using its copy of the secret key to generate an authentication response and transfers the response to AMF 621 over RAN 610. AMF 621 determines the authentication response generated by UE 601 and the expected result match and responsively registers UE 601 with network core 620.

Responsive to the successful registration, AMF 621 generates a context request for access and mobility subscription data, SMF selection data, and UE context SMF data for UE 601. AMF 621 transfers the context request to vSEPP 627 in 5GC signaling which screens the signaling before delivering it to 5EIWF 628. 5EIWF 628 translates the 5GC context request into EPC signaling and transfers the EPC signaling to EPC network elements 641 over vDEA 629 and hDEA 642. EPC network elements 641 access the subscriber profile for UE 601 and retrieve the requested data. For example, EPC network elements 641 may comprise an MME and an HSS. The MME may request context for UE 601 stored from the HSS. The HSS may access the subscriber profile and retrieve the access and mobility subscription data, the SMF selection data, and the UE context SMF data. Since LTE network core 640 is an LTE only network, the HSS may instead retrieve LTE analogs of the access and mobility subscription data, the SMF selection data, and the UE context SMF data which can then be correlated to 5G service metrics by 5G network core 620. The HSS may then return the retrieved data to the MME. EPC network elements 641 transfer the requested data to 5EIWF 628 in EPC signaling over hDEA 642 and vDEA 629. 5EIWF 628 translates the signaling into corresponding 5GC signaling that carries the access and mobility subscription data, the SMF selection data, and the UE context SMF data or LTE analogs of this data. 5EIWF 628 transfers the 5GC signaling to AMF 621 over vSEPP 627 which screens for any unauthorized messages. AMF 621 receives the 5GC signaling and creates UE context using the received data. The UE context comprises information like QoS metrics, slice selection information, S-NSSAIs, subscribed service features, PDU session information, and the like.

Once the context is created, AMF 621 registers with PCF 625 to create a policy association for UE 601. AMF 621 notifies PCF 625 that UE 601 is a visiting device and the HPLMN of UE 601 is LTE network 630. PCF 625 creates a policy association request for UE 601 in 5GC signaling and transfers the request to vSEPP 627. vSEPP 627 screens the 5GC signaling for unauthorized communications before delivering the request 5EIWF 628. 5EIWF 628 translates the 5GC policy association request into corresponding EPC signaling that carries the policy association request. 5EIWF 628 transfers the EPC signaling to EPC network elements 641 over vDEA 629 and hDEA 642. In response to the request, EPC network elements 641 select network policies and policy enforcement criteria for UE 601 like QoS levels, slice selection criteria, charging policies, and the like. For example, EPC network elements 641 may comprise a PCRF. The PCRF may receive the EPC signaling carrying the policy association request and responsively create a policy association for UE 601. EPC network elements 641 transfer the EPC signaling that carries the selected network policies and policy enforcement criteria to 5EIWF 628 over hDEA 642 and vDEA 629. 5EIWF 628 translates the EPC signaling into corresponding 5GC signaling that carries the network policy data. 5EIWF 628 transfers the 5GC signaling to PCF 625 over vSEPP 627 which screens for any unwanted messages. PCF 625 transfers the network policies to AMF 621 and subscribes to AMF 621 for UE 601 event reporting like location reporting and registration state change.

Once the policy association is created, AMF 621 selects NSSF 624 to select a network slice(s) for UE 601. AMF 621 indicates the network slice requested by UE 601 in the registration request and the slice selection information retrieved in the UE context to NSSF 624. NSSF 624 uses the selection information and the requested network slice to select a network slice for UE 601. NSSF 624 returns slice ID for the selected slice to AMF 621. For example, NSSF 624 may select a non-GBR slice, a GBR slice, and/or an eMBB slice for UE 601. It should be appreciated that LTE network 630 may lack network slicing functionality and therefore may not be able to provide slice selection criteria to 5G network core 620. In this case, NSSF 624 may access UDM 626 for slice selection criteria and indicate that UE 601 is roaming from an LTE only home network. UDM 626 may generate or otherwise retrieve slice selection metrics for UE 601 based on a Service Level Agreement (SLA), a generic slice selection template, or some other criteria and return the slice selection metrics for UE 601 to NSSF 624. For example, UDM 626 may correlate the QoS levels provided by LTE network 630 into slice selection criteria and provide the criteria to NSSF 624.

AMF 621 selects SMF 622 to establish the PDU session(s) requested by UE 601 in the initial registration request. AMF 621 indicates that UE 601 is roaming on network 600 and that the home network of UE 601 is LTE network 630 to SMF 622. AMF 621 may select SMF 622 based on the SMF selection data, slice ID, QoS metrics, requested PDU sessions, service attributes, and/or other data received from LTE network 630 or received in the registration request from UE 601. SMF 622 selects UPF 623 based on the slice ID selected by NSSF 624 and controls UPF 623 to serve UE 601. SMF 622 generates a 5GC PDU session establishment request for UE 601 and transfers the request over vSEPP 627 to 5EIWF 628. vSEPP 627 screens the message for any unauthorized signaling before delivering the request to 5EIWF 628. 5EIWF 628 translates the 5GC session establishment request into a corresponding EPC request and transfers the request to EPC network elements 641 over vDEA 629 and hDEA 642.

EPC network elements 641 approves the PDU session request and organizes its user plane elements to support the PDU session. For example, EPC network elements 641 may comprise a P-GW and an S-GW. The P-GW may receive the EPC signaling carrying the PDU session request. The P-GW may approve the request and select the S-GW to serve UE 601. EPC network elements 641 generate a PDU session response that approves the creation of the session and that includes the network addresses of its user plane elements to support the session. EPC network elements 641 transfer EPC signaling that carries the PDU session response to 5EIWF 528 over hDEA 642 and vDEA 629. 5EIWF 628 translates the EPC signaling into corresponding 5GC signaling that carries the PDU session response. 5EIWF 528 transfers the 5GC signaling to vSEPP 627 which screens for any unauthorized messages before delivering the 5GC signaling to SMF 622.

SMF 622 receives the response and indicates the network addresses for UPF 623 and the user plane elements of EPC network elements 641 to AMF 621. AMF 621 includes the policy information provided by PCF 625, the slice ID returned by NSSF 624, and the network addresses provided by SMF 622 in the UE context. AMF 621 transfers a registration accept message that comprises the UE context to CU 613. CU 613 wirelessly transfers the registration accept message to UE 601 over DU 612 and RU 611. UE 601 uses the UE context to begin its PDU sessions with network core 620. UE 601 generates uplink user data for its PDU session. UE 601 wirelessly transfers the uplink user data to CU 613 over RU 611 and DU 612. CU 613 transfers the uplink user data to UPF 623. UPF 623 transfers the uplink data to EPC network elements 641. EPC network elements 641 transfer the uplink user data to data network 651. Data network 651 generates downlink user data for the PDU session and transfers the downlink data to EPC network elements 641. EPC network elements 641 transfer the downlink user data to UPF 623. UPF 623 transfers the downlink data to CU 613. CU 613 wirelessly transfers the downlink data to UE 601 over DU 612 and RU 611.

Figure 7:
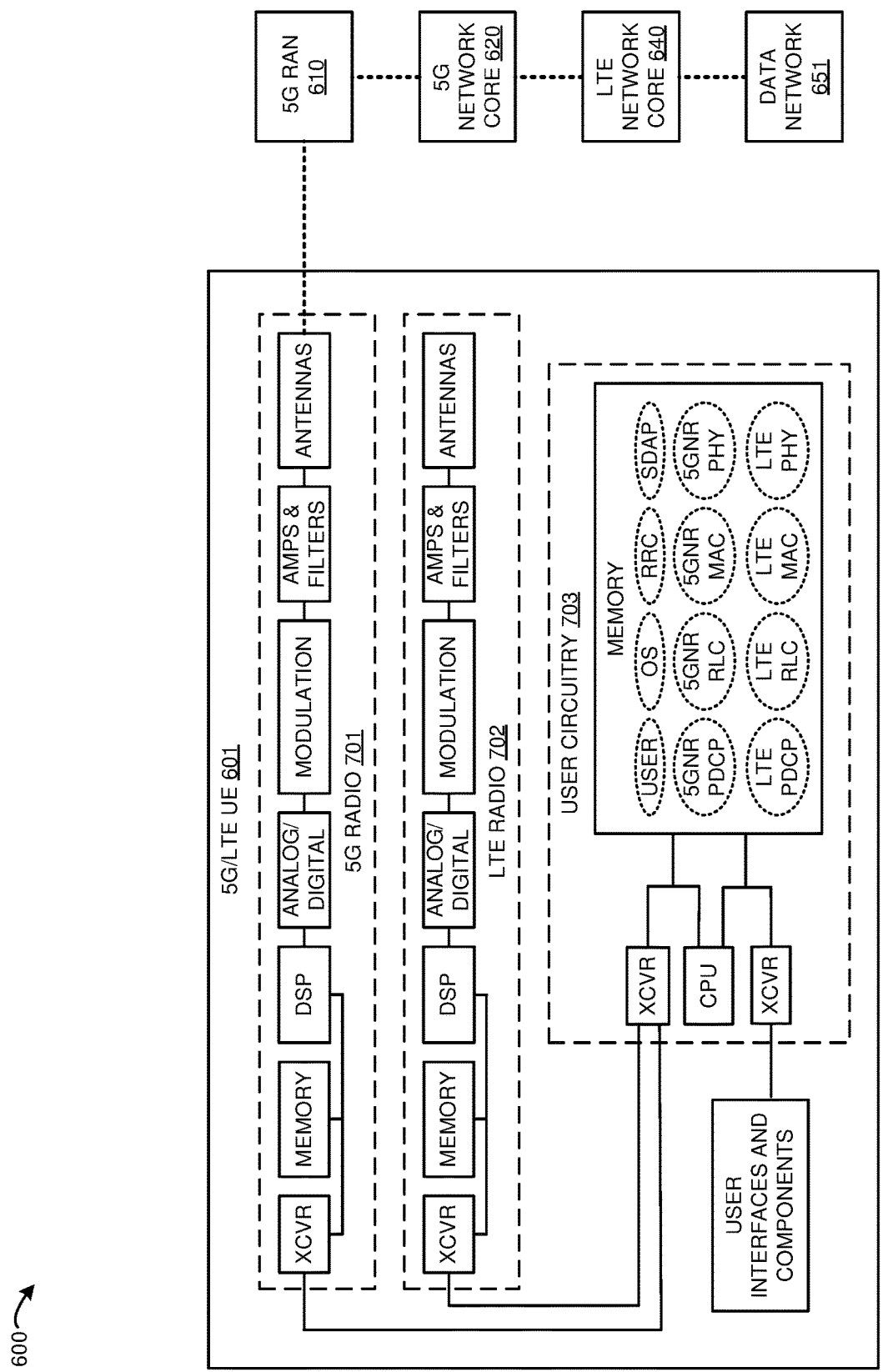
FIG. 7 illustrates a 5G/LTE visiting UE in the 5G communication network.

FIG. 7 illustrates 5G UE 601 in 5G communication network 600. UE 601 comprises an example of user device 101 illustrated in FIG. 1 and UE 301 illustrated in FIG. 3, however user device 101 and UE 301 may differ. UE 601 comprises 5G radio 701, LTE radio 702, and user circuitry 703. Radios 701 and 702 comprise antennas, amplifiers, filters, modulation, analog-to-digital interfaces, Digital Signal Processors (DSP), memory, and transceivers (XCVRs) that are coupled over bus circuitry. User circuitry 703 comprises memory, CPU, user interfaces and components, and transceivers that are coupled over bus circuitry. The memory in user circuitry 703 stores an operating system (OS), user applications (USER), 5GNR network applications for Physical Layer (PHY), Media Access Control (MAC), Radio Link Control (RLC), Packet Data Convergence Protocol (PDCP), Service Data Adaptation Protocol (SDAP), and Radio Resource Control (RRC), and LTE network applications for PDCP, RLC, MAC, and PHY. The antenna in radio 701 is wirelessly coupled to 5G RAN 610 over 5GNR links. A transceiver in radio 701 is coupled to a transceiver in user circuitry 703. A transceiver in user circuitry 703 is typically coupled to the user interfaces and components like displays, controllers, and memory.

A transceiver in radio 702 is coupled to a transceiver in user circuitry 703. Since UE 601 is attached to a 5G RAN, the LTE antenna in radio 702 is not wirelessly coupled to any RAN. However, when UE 601 is within the coverage area of its home network (LTE network 630), UE 601 instead attaches to an LTE RAN. When in this configuration, the 5G antenna in radio 701 would not be wirelessly coupled to any RAN as network 630 is an LTE only network.

In radio 701, the antennas receive wireless signals from 5G RAN 610 that transport downlink 5GNR signaling and data. The antennas transfer corresponding electrical signals through duplexers to the amplifiers. The amplifiers boost the received signals for filters which attenuate unwanted energy. Demodulators down-convert the amplified signals from their carrier frequency. The analog/digital interfaces convert the demodulated analog signals into digital signals for the DSPs. The DSPs transfer corresponding 5GNR symbols to user circuitry 703 over the transceivers. In user circuitry 703, the CPU executes the network applications to process the 5GNR symbols and recover the downlink 5GNR signaling and data. The 5GNR network applications receive new uplink signaling and data from the user applications. The network applications process the uplink user signaling and the downlink 5GNR signaling to generate new downlink user signaling and new uplink 5GNR signaling. The network applications transfer the new downlink user signaling and data to the user applications. The 5GNR network applications process the new uplink 5GNR signaling and user data to generate corresponding uplink 5GNR symbols that carry the uplink 5GNR signaling and data.

In radio 701, the DSP processes the uplink 5GNR symbols to generate corresponding digital signals for the analog-to-digital interfaces. The analog-to-digital interfaces convert the digital uplink signals into analog uplink signals for modulation. Modulation up-converts the uplink analog signals to their carrier frequency. The amplifiers boost the modulated uplink signals for the filters which attenuate unwanted out-of-band energy. The filters transfer the filtered uplink signals through duplexers to the antennas. The electrical uplink signals drive the antennas to emit corresponding wireless 5GNR signals to 5G RAN 610 that transport the uplink 5GNR signaling and data.

RRC functions comprise authentication, security, handover control, status reporting, QoS, network broadcasts and pages, and network selection. SDAP functions comprise QoS marking and flow control. PDCP functions comprise security ciphering, header compression and decompression, sequence numbering and re-sequencing, de-duplication. RLC functions comprise Automatic Repeat Request (ARQ), sequence numbering and resequencing, segmentation and resegmentation. MAC functions comprise buffer status, power control, channel quality, Hybrid ARQ (HARQ), user identification, random access, user scheduling, and QoS. PHY functions comprise packet formation/deformation, windowing/de-windowing, guard-insertion/guard-deletion, parsing/de-parsing, control insertion/removal, interleaving/de-interleaving, Forward Error Correction (FEC) encoding/decoding, channel coding/decoding, channel estimation/equalization, and rate matching/de-matching, scrambling/descrambling, modulation mapping/de-mapping, layer mapping/de-mapping, precoding, Resource Element (RE) mapping/de-mapping, Fast Fourier Transforms (FFTs)/Inverse FFTs (IFFTs), and Discrete Fourier Transforms (DFTs)/Inverse DFTs (IDFTs).

Figure 8:
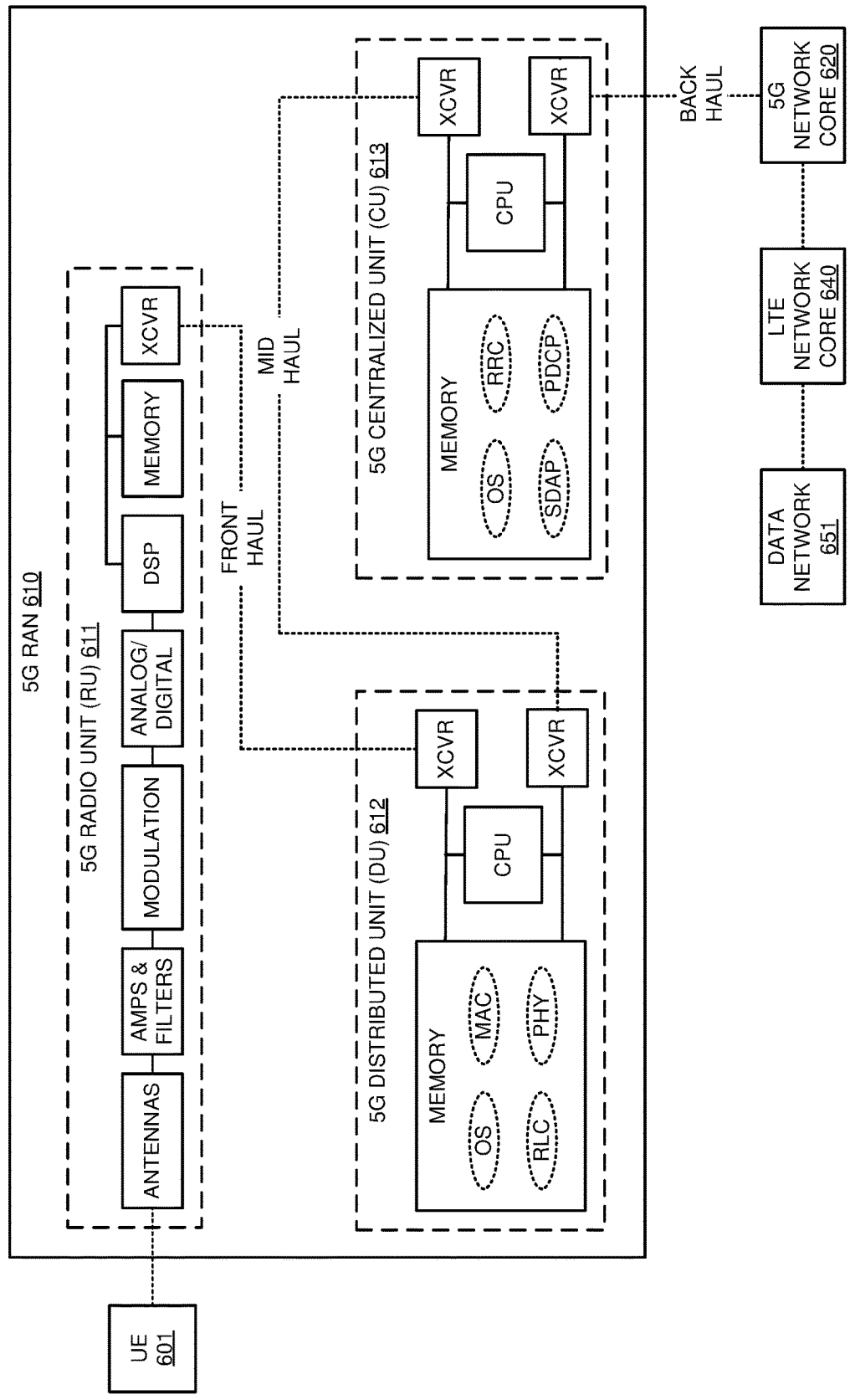
FIG. 8 illustrates a 5G Radio Access Network (RAN) in the 5G wireless communication network.

FIG. 8 illustrates 5G RAN 610 in 5G communication network 600. 5G RAN 610 comprises 5G Radio Unit (RU) 611, 5G Distributed Unit (DU) 612, and 5G Centralized Unit (CU) 613. RAN 610 comprises an example of access network 111 illustrated in FIGS. 1 and 5G RAN 311 illustrated in FIG. 3, however access network 111 and 5G RAN 311 may differ.

RU 611 comprises antennas, amplifiers, filters, modulation, analog-to-digital interfaces, DSP, memory, and transceivers (XCVRs) that are coupled over bus circuitry. UE 601 is wirelessly coupled to the antennas in RU 611 over 5GNR links. Transceivers in 5G RU 611 are coupled to transceivers in 5G DU 612 over fronthaul links like enhanced Common Public Radio Interface (eCPRI). The DSPs in RU 611 executes their operating systems and radio applications to exchange 5GNR signals with UE 601 and to exchange 5GNR data with DU 612.

For the uplink, the antennas receive wireless signals from UE 601 that transport uplink 5GNR signaling and data. The antennas transfer corresponding electrical signals through duplexers to the amplifiers. The amplifiers boost the received signals for filters which attenuate unwanted energy. Demodulators down-convert the amplified signals from their carrier frequencies. The analog/digital interfaces convert the demodulated analog signals into digital signals for the DSPs. The DSPs transfer corresponding 5GNR symbols to DU 612 over the transceivers.

For the downlink, the DSPs receive downlink 5GNR symbols from DU 612. The DSPs process the downlink 5GNR symbols to generate corresponding digital signals for the analog-to-digital interfaces. The analog-to-digital interfaces convert the digital signals into analog signals for modulation. Modulation up-converts the analog signals to their carrier frequencies. The amplifiers boost the modulated signals for the filters which attenuate unwanted out-of-band energy. The filters transfer the filtered electrical signals through duplexers to the antennas. The filtered electrical signals drive the antennas to emit corresponding wireless signals to UE 601 that transport the downlink 5GNR signaling and data.

DU 612 comprises memory, CPU, and transceivers that are coupled over bus circuitry. The memory in 5G DU 612 stores operating systems and 5GNR network applications like PHY, MAC, and RLC. CU 613 comprises memory, CPU, and transceivers that are coupled over bus circuitry. The memory in CU 613 stores an operating system, 5GNR network applications like PDCP, SDAP, and RRC. Transceivers in 5G DU 612 are coupled to transceivers in RU 611 over front-haul links. Transceivers in DU 612 are coupled to transceivers in CU 613 over mid-haul links. A transceiver in CU 613 is coupled to network core 620 over backhaul links.

RLC functions comprise ARQ, sequence numbering and resequencing, segmentation and resegmentation. MAC functions comprise buffer status, power control, channel quality, HARQ, user identification, random access, user scheduling, and QoS. PHY functions comprise packet formation/deformation, guard-insertion/guard-deletion, parsing/de-parsing, control insertion/removal, interleaving/de-interleaving, FEC encoding/decoding, channel coding/decoding, channel estimation/equalization, and rate matching/de-matching, scrambling/descrambling, modulation mapping/de-mapping, layer mapping/de-mapping, precoding. RE mapping/de-mapping. FFTs/IFFTs, and DFTs/IDFTs. PDCP functions include security ciphering, header compression and decompression, sequence numbering and re-sequencing, de-duplication. SDAP functions include QoS marking and flow control. RRC functions include authentication, security, handover control, status reporting, QoS, network broadcasts and pages, and network selection.

Figure 9:
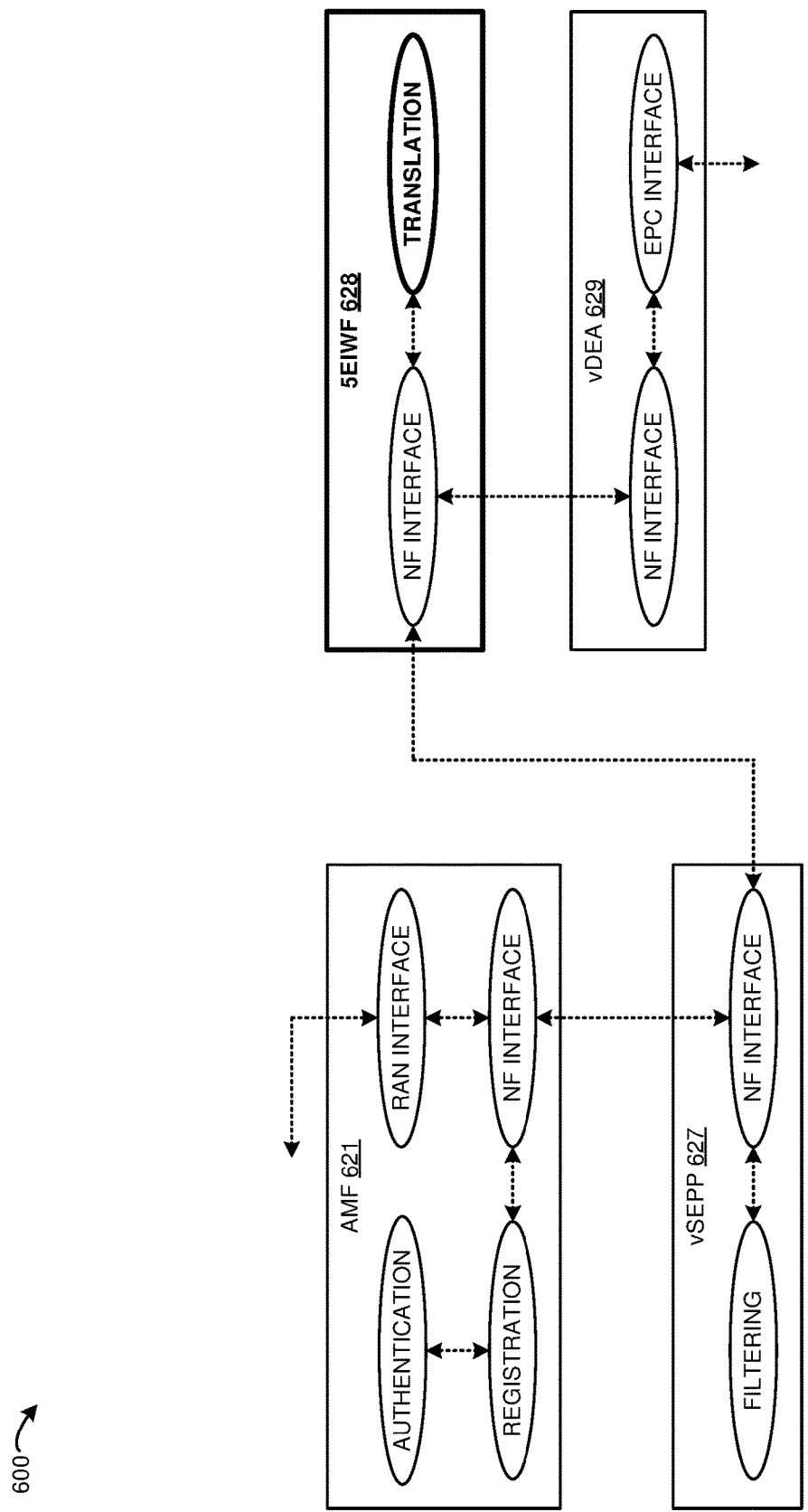
FIG. 9 illustrates network functions in the 5G wireless communication network.

FIG. 9 illustrates AMF 621, vSEPP 627, 5EIWF 628, and vDEA 629 in 5G wireless communication network 600. AMF 621 comprises modules for UE registration, UE authentication, network function (NF) interfacing, and RAN interfacing. The registration module generates and exchanges registration signaling with UE 601. The authentication module processes authentication challenges and confirms authentication responses received from UE 601. vSEPP 627 comprises modules for network function interfacing and inter-PLMN message filtering. The message filtering module processes incoming and outgoing inter-PLMN traffic to block unauthorized, malicious, or otherwise unwanted traffic. 5EIWF 628 comprises modules for network function interfacing and EPC/5GC signaling translation. The translation module converts 5GC signaling to EPC signaling and vice-versa to facilitate communication between 5GC stand alone core networks and EPC stand alone core networks. For example, 5EIWF 628 may host a data structure that correlates EPC signaling types to 5GC signaling types (e.g., the data structure may correlate 5GC N32 signaling to EPC s6a signaling). vDEA 629 comprises modules for network function interfacing and EPC interfacing. The interfacing modules allow AMF 621, vSEPP 627, 5EIWF 628, and vDEA 629 to exchange signaling with each other, the other network functions in 5G core 620, and with external systems like 5G RAN 610 and LTE network core 640.

Figure 10:
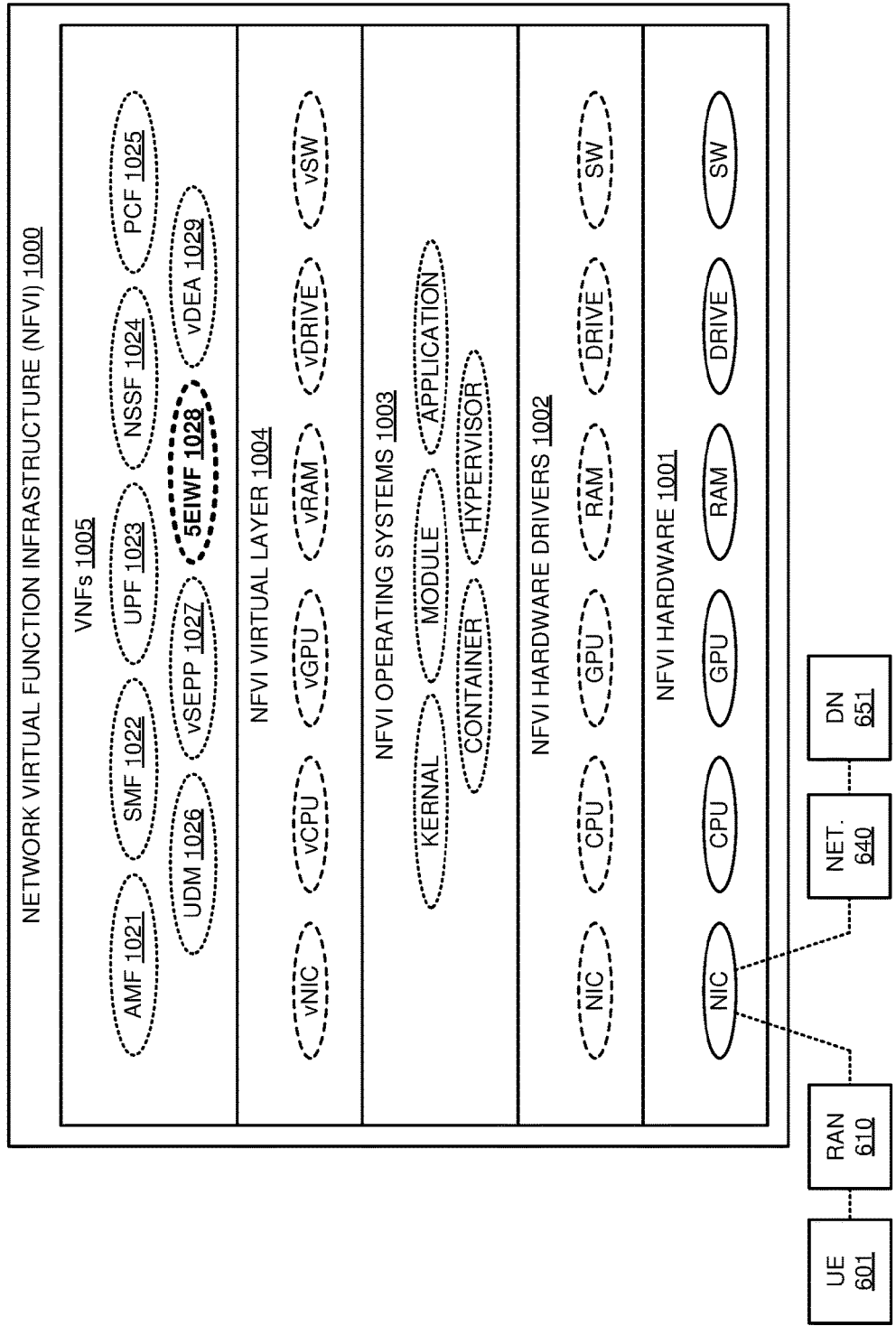
FIG. 10 illustrates a Network Function Virtualization Infrastructure (NFVI) in the 5G wireless communication network.

FIG. 10 illustrates Network Function Virtualization Infrastructure (NFVI) 1000 in 5G wireless communication network 600. NFVI 1000 comprises an example of core network 121 illustrated in FIG. 1 and network circuitry 320 illustrated in FIG. 3, although core network 121 and network circuitry 320 may differ. NFVI 1000 comprises NFVI hardware 1001, NFVI hardware drivers 1002, NFVI operating systems 1003, NFVI virtual layer 1004, and NFVI Virtual Network Functions (VNFs) 1005. NFVI hardware 1001 comprises Network Interface Cards (NICs), CPU, GPU, RAM, Flash/Disk Drives (DRIVE), and Data Switches (SW). NFVI hardware drivers 1002 comprise software that is resident in the NIC, CPU, GPU, RAM, DRIVE, and SW. NFVI operating systems 1003 comprise kernels, modules, applications, containers, hypervisors, and the like. NFVI virtual layer 1004 comprises vNIC, vCPU, GPU, vRAM, vDRIVE, and vSW. NFVI VNFs 1005 comprise AMF 1021, SMF 1022, UPF 1023, NSSF 1024, PCF 1025, UDM 1026, vSEPP 1027, 5EIWF 1028, and vDEA 1029. Additional VNFs and network elements like NRF, SCP, NEF, and AF are typically present but are omitted for clarity. NFVI 1000 may be located at a single site or be distributed across multiple geographic locations. The NIC in NFVI hardware 1001 is coupled to RAN 610 and LTE network core 640. NFVI hardware 1001 executes NFVI hardware drivers 1002, NFVI operating systems 1003, NFVI virtual layer 1004, and NFVI VNFs 1005 to form AMF 621, SMF 622, UPF 623, NSSF 624, PCF 625, UDM 626, vSEPP 627, 5EIWF 628, and vDEA 629.

Figure 11:
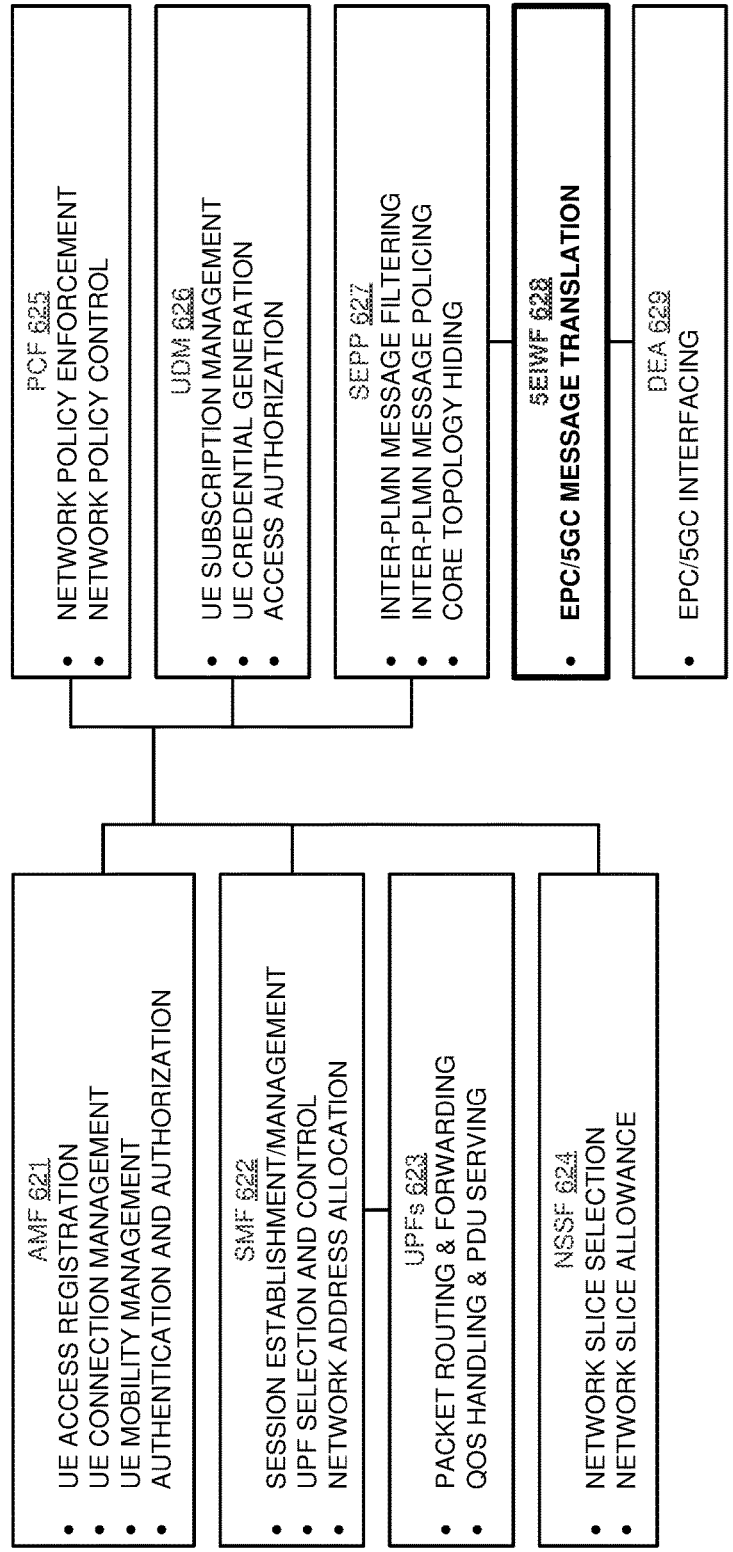
FIG. 11 further illustrates the NFVI in the 5G wireless communication network.

FIG. 11 further illustrates NFVI 1200 in 5G communication network 600. AMF 621 comprises capabilities for UE access registration, UE connection management, UE mobility management, UE authentication, and UE authorization. SMF 622 comprises capabilities for session establishment, session management, UPF selection/control, and network address allocation. UPF 623 comprises capabilities for packet routing, packet forwarding, QoS handling, and PDU serving. NSSF 624 comprises capabilities for network slice selection and network slice allowance. PCF 625 comprises capabilities for network policy enforcement and network policy control. UDM 626 comprises capabilities for UE subscription management, UE credential generation, and UE access authorization. SEPP 627 comprise capabilities for inter-PLMN message filtering, inter-PLMN message policing, and core topology hiding. 5EIWF 628 comprises capabilities for EPC/5GC message translation. DEA 629 comprises capabilities for EPC/5GC interfacing.

In some examples, AMF 621 receives a registration request from visiting UE 601 over RAN 610. The registration request specifies a registration type, the HPLMN of UE 601, UE capabilities, and a slice request. AMF 621 transfers an identity request to UE 601 and subsequently receives the SUCI from UE 601 over RAN 610. AMF 621 identifies that HPLMN ID of UE 601 corresponds to LTE network 630. In response, AMF 621 generates a 5GC authentication request that includes the SUCI of UE 601 and transfers the request to vSEPP 627. vSEPP 627 approves and forwards the request to 5EIWF 628. 5EIWF 628 translates the 5GC authentication request into a corresponding EPC authentication request and transfers the request to EPC network elements 641 over vDEA 629 and hDEA 642. 5EIWF 628 receives EPC signaling from EPC network elements 641 that carries authentication vectors and the SUPI for UE 601. 5EIWF 628 translates the EPC signaling that carries the SUPI and authentication vectors into corresponding 5GC signaling. 5EIWF 628 transfers the corresponding 5GC signaling to vSEPP 627. vSEPP 627 approves and forwards the 5GC signaling to AMF 621. AMF 621 interfaces with UE 601 over RAN 610 to authenticate UE 601 based on the authentication vectors and SUPI. Once authenticated, AMF 621 registers UE 601 for service on network core 620.

Responsive to the successful registration, AMF 621 generates a context request and transfers 5GC signaling that carries the context request to vSEPP 627. vSEPP 627 approves and forwards the signaling to 5EIWF 628. 5EIWF 628 translates the 5GC signaling into corresponding EPC signaling that carries the context request. 5EIWF 628 transfers the EPC signaling to EPC network elements 641 over vDEA 629 and hDEA 642. 5EIWF 628 then receives EPC signaling over vDEA 629 that carries subscriber data for UE 601 from EPC network elements 641. 5EIWF 628 translates the EPC signaling into corresponding 5GC signaling that carries the subscriber data. 5EIWF 628 the transfers 5GC signaling vSEPP 627. vSEPP 627 approves and forwards the 5GC signaling to AMF 621. AMF 621 creates UE context for UE 601 using the received data.

Once the context is created, AMF 621 registers with PCF 625 to create a policy association for UE 601. PCF 625 creates a policy association request for UE 601 and transfers 5GC signaling that carries the policy association request to vSEPP 627. vSEPP 627 approves and forwards the 5GC signaling to 5EIWF 628. 5EIWF 628 translates the 5GC signaling into corresponding EPC signaling that carries the policy association request. 5EIWF 628 transfers the EPC signaling to EPC network elements 641 over vDEA 629 and hDEA 642. 5EIWF 628 receives EPC signaling over vDEA 629 that carries network polices and policy enforcement criteria from EPC network elements 641. 5EIWF 628 translates the EPC signaling into corresponding 5GC signaling that carries the network policies and enforcement criteria. 5EIWF 628 transfers the 5GC signaling to vSEPP 627. vSEPP 627 approves and forwards the 5GC signaling to PCF 625. PCF 625 transfers the network policies to AMF 621 and subscribes to AMF 621 for event reporting regarding UE 601. AMF 621 then selects NSSF 624 to select network slices for UE 601. NSSF 624 uses selection information retrieved from UDM 626 and/or received from UE 601 in the registration request to select a network slice for UE 601. NSSF 624 returns slice ID for the selected slice to AMF 621.

AMF 621 selects SMF 622 to set up the user plane for UE 601. SMF 622 selects UPF 623 based on slice ID selected by NSSF 624 and controls UPF 623 to serve UE 601. SMF 622 generates a session establishment request and transfers 5GC signaling that carries the request to vSEPP 627. vSEPP 627 approves and forwards the signaling to 5EIWF 628. 5EIWF 628 translates the 5GC signaling into corresponding EPC signaling that carries the session establishment request. 5EIWF 628 transfers the EPC signaling to EPC network elements 641 over vDEA 629 and hDEA 642. 5EIWF 628 receives EPC signaling that carries a session response over vDEA 629. The session response includes network addresses for user plane elements in EPC network elements 641. 5EIWF 628 translates the EPC signaling into corresponding 5GC signaling that carries the session response and transfers the 5GC signaling to vSEPP 627. vSEPP 627 approves and forwards the 5GC signaling to SMF 622. SMF 622 receives the response and indicates the network addresses for UPF 623 and the user plane elements of EPC network elements 641 to AMF 621. AMF 621 includes the policy information provided by PCF 625, the slice ID returned by NSSF 624, and the network addresses provided by SMF 622 in the UE context. AMF 621 transfers a registration accept message that comprises the UE context to UE 601 over RAN 610.

Once UE 601 is registered on network 600 and in possession of the UE context, UE 601 uses the UE context to initiate a voice session with another UE (not illustrated) in data network 651. Although not illustrated for sake of clarity, networks 600 and 630 each comprise an Internet Protocol Multimedia Subsystem (IMS). IMS provides services to facilitate multimedia sessions (e.g., voice calls) between user devices. In particular, IMS may receive a multimedia request from a calling user device (in this example, UE 601) and identify the network address for the called user device. IMS then interfaces with the core network elements to establish the end-to-end connection between the calling user device and the called user device. For example, AMF 621 or the IMS in network core 620 may generate 5GC signaling indicating the voice call request from UE 601. 5EIWF 628 may translate this 5GC signaling into EPC signaling that indicates the voice call and transfer the signaling to EPC network elements 641. 5EIWF 628 may receive and translate EPC signaling comprising a voice call response from EPC network elements 641. 5EIWF 628 indicates the resulting 5GC signaling to AMF 621 or the IMS which interfaces with the user plane elements (e.g., UPF 623) to establish the voice session for UE 601. Returning to the example, once the IMS in 5G network core 620 and LTE network core have established the end-to-end connection between UE 601 and the called UE in data network 651, UPF 623 exchanges voice data with UE 601 over RAN 610. UPF 623 exchanges the voice data with EPC network elements 641. EPC network elements 641 exchange the voice data with data network 651. Data network 651 exchanges the voice data with the called UE.

Figure 12:
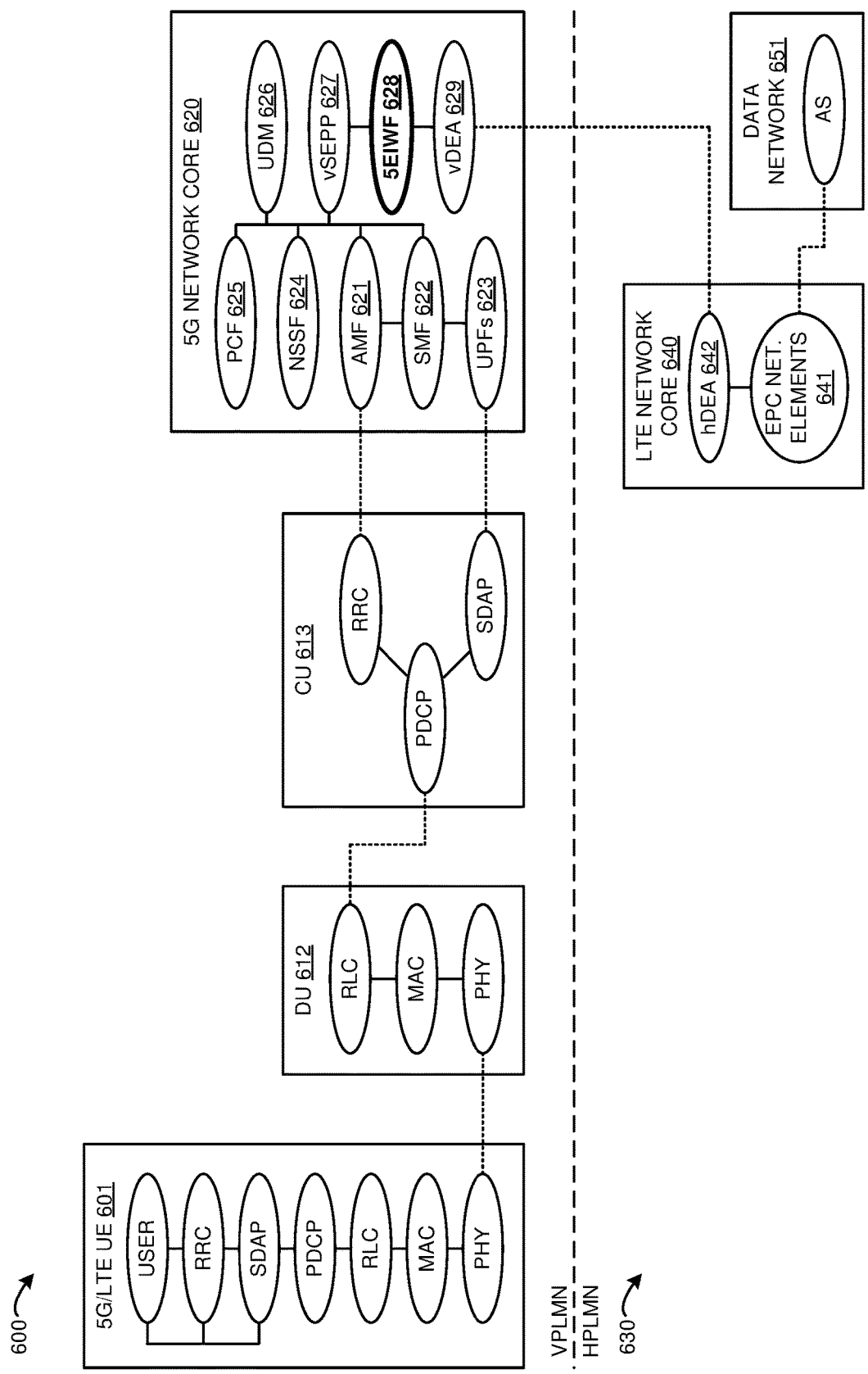
FIG. 12 illustrates an exemplary operation of the 5G visited wireless communication network to interwork between 5GC network elements and an EPC home network.

FIG. 12 illustrates an exemplary operation of 5G communication network 600 to interwork between 5GC network elements and an EPC home network. The operation may vary in other examples. In some examples, the UE 601 wirelessly attaches to RAN 610 and the RRC in UE 601 transfers a registration request to the RRC in CU 613 over the PDCPs, RLCs, MACS, and PHYs. The registration request includes indicates a registration type, the HPLMN of UE 601, UE capabilities, a slice request, and a PDU session request. The RRC in CU 613 forwards the registration request to AMF 621. AMF 621 transfers an identity request for UE 601 to the RRC in CU 613. The RRC transfers the identity request to the RRC in UE 601 over the PDCPs, RLCs, MACs, and PHYs. The RRC retrieves the SUCI for UE 601 from memory and transfers the SUCI to the RRC in CU 613 over the PDCPs, RLCs, MACs, and PHYs. The RRC in CU 613 forwards the SUCI to AMF 621. AMF 621 determines UE 601 is a visiting UE and that the home network of UE 601 is LTE network 630. In response, AMF 621 generates an authentication request that includes the SUCI and transfers 5GC signaling that carries the authentication request 5EIWF 628 over vSEPP 627. 5EIWF 628 translates the 5GC signaling into EPC signaling that carries the authentication request and transfers the EPC signaling to EPC network elements 641 over vDEA 629 and hDEA 642.

EPC network elements 641 retrieve the SUPI for UE 601 based on the SUCI provided by UE 601. EPC network elements 641 generate authentication vectors that comprise an authentication challenge, key selection criteria, and a random number. EPC network elements 641 generate an authentication response that comprises the SUPI and vectors and transfer EPC signaling that carries the authentication response to 5EIWF 628 over hDEA 642 and vDEA 629. 5EIWF 628 translates the EPC signaling into 5GC signaling that carries the authentication response. 5EIWF 628 transfers the 5GC signaling to AMF 621 over vSEPP 627. AMF 621 transfers the authentication challenge to the RRC in CU 613. The RRC in CU 613 transfers the authentication challenge to the RRC in UE 601 over the PDCPs, RLCs, MACs, and PHYs. The RRC in UE 601 generates an authentication response and transfers the response to the RRC in CU 613 over the PDCPs, RLCs, MACs, and PHYs. The RRC in CU 613 forwards the response to AMF 621. AMF 621 matches the authentication response to an expected result and responsively registers UE 601 with network core 620.

In response to the registration, AMF 621 generates a context request for UE 601. AMF 621 transfers 5GC signaling that carries the context request to 5EIWF 628 over vSEPP 627. 5EIWF 628 translates the 5GC signaling into EPC signaling that carries the context request and transfers the EPC signaling to EPC network elements 641 over vDEA 629 and hDEA 642. EPC network elements 641 access the subscriber profile for UE 601 and retrieve the requested data. EPC network elements 641 generate EPC signaling that carries the requested data to 5EIWF 628 in EPC signaling over hDEA 642 and vDEA 629. 5EIWF 628 translates the EPC signaling into 5GC signaling that carries requested data and transfers the 5GC signaling to AMF 621 over vSEPP 627. AMF 621 receives the 5GC signaling and creates UE context using the received data. The UE context comprises QoS metrics, slice selection information, S-NSSAIs, subscribed service features, and PDU session information.

AMF 621 registers with PCF 625 to create a policy association for UE 601. PCF 625 creates a policy association request for UE 601 and transfers 5GC signaling that carries the request to 5EIWF 628 over vSEPP 627. 5EIWF 628 translates the 5GC signaling into EPC signaling that carries the policy association request. 5EIWF 628 transfers the EPC signaling to EPC network elements 641 over vDEA 629 and hDEA 642. EPC network elements 641 select network policies and policy enforcement criteria for UE 601. EPC network elements 641 transfer the EPC signaling that carries the selected network policies and policy enforcement criteria to 5EIWF 628 over hDEA 642 and vDEA 629. 5EIWF 628 translates the EPC signaling into corresponding 5GC signaling that carries the network policy data. 5EIWF 628 transfers the 5GC signaling to PCF 625 over vSEPP 627. PCF 625 transfers the network policies to AMF 621 and subscribes to AMF 621 for UE 601 event reporting.

AMF 621 selects NSSF 624 to select network slices for UE 601. AMF 621 indicates the network slice requested by UE 601 in the registration request and the slice selection information retrieved in the UE context to NSSF 624. NSSF 624 uses the selection information and the requested network slice to select a network slice for UE 601. NSSF 624 returns slice ID for the selected slice to AMF 621.

AMF 621 selects SMF 622 to establish the PDU session (s) requested by UE 601. SMF 622 selects UPF 623 based on the slice ID selected by NSSF 624 and controls UPF 623 to serve UE 601. SMF 622 generates a 5GC PDU session establishment request for UE 601 and transfers 5GC signaling that carries the PDU session establishment to 5EIWF 628 over vSEPP 627. 5EIWF 628 translates the 5GC signaling into EPC signaling that carries the PDU session establishment request into and transfers the EPC signaling to EPC network elements 641 over vDEA 629 and hDEA 642.

EPC network elements 641 approves the PDU session request and organizes its user plane elements to support the PDU session. EPC network elements 641 generate a PDU session response that includes the network addresses of its user plane elements. EPC network elements 641 transfer EPC signaling that carries the PDU session response to 5EIWF 528 over hDEA 642 and vDEA 629. 5EIWF 628 translates the EPC signaling into 5GC signaling that carries the PDU session response. 5EIWF 528 transfers the 5GC signaling to SMF 622 over vSEPP 627.

SMF 622 receives the response and indicates the network addresses for UPF 623 and the user plane elements of EPC network elements 641 to AMF 621. AMF 621 includes the policy information provided by PCF 625, the slice ID returned by NSSF 624, and the network addresses provided by SMF 622 in the UE context. AMF 621 transfers a registration accept message that comprises the UE context to the RRC in CU 613. The RRC in CU 613 transfers the registration accept message to the RRC in UE 601 over the PDCPs, RLCs, MACs, and PHYs.

In response to the execution of a user application, the RRC in UE 601 directs the SDAP in UE 601 to begin the PDU session. The user application in UE 601 generates uplink user data for the PDU session. The SDAP in UE 601 transfers the uplink user data to the SDAP in CU 613 over RU 611 and DU 612. The SDAP in CU 613 transfers the uplink user data to UPF 623. UPF 623 transfers the uplink data to EPC network elements 641. EPC network elements 641 transfer the uplink data to the AS in data network 651. The AS in data network 651 generates downlink user data for the PDU session and transfers the downlink data to EPC network elements 641. EPC network elements 641 transfer the downlink user data to UPF 623. UPF 623 transfers the downlink data to the SDAP in CU 613. The SDAP in CU 613 transfers the downlink data to the SDAP in UE 601 over the PDCPs, RLCs, MACs, and PHYs.

The wireless data network circuitry described above comprises computer hardware and software that form special-purpose network circuitry to interwork between a 5G visited network and an LTE home network. The computer hardware comprises processing circuitry like CPUs, DSPs, GPUs, transceivers, bus circuitry, and memory. To form these computer hardware structures, semiconductors like silicon or germanium are positively and negatively doped to form transistors. The doping comprises ions like boron or phosphorus that are embedded within the semiconductor material. The transistors and other electronic structures like capacitors and resistors are arranged and metallically connected within the semiconductor to form devices like logic circuitry and storage registers. The logic circuitry and storage registers are arranged to form larger structures like control units, logic units, and Random-Access Memory (RAM). In turn, the control units, logic units, and RAM are metallically connected to form CPUs, DSPs, GPUs, transceivers, bus circuitry, and memory.

In the computer hardware, the control units drive data between the RAM and the logic units, and the logic units operate on the data. The control units also drive interactions with external memory like flash drives, disk drives, and the like. The computer hardware executes machine-level software to control and move data by driving machine-level inputs like voltages and currents to the control units, logic units, and RAM. The machine-level software is typically compiled from higher-level software programs. The higher-level software programs comprise operating systems, utilities, user applications, and the like. Both the higher-level software programs and their compiled machine-level software are stored in memory and retrieved for compilation and execution. On power-up, the computer hardware automatically executes physically-embedded machine-level software that drives the compilation and execution of the other computer software components which then assert control. Due to this automated execution, the presence of the higher-level software in memory physically changes the structure of the computer hardware machines into special-purpose network circuitry to interwork between a 5G visited network and an LTE home network.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. Thus, the invention is not limited to the specific embodiments described above, but only by the following claims and their equivalents.

What is claimed is:

1. A method of operating a Fifth Generation (5G) visited wireless communication network to interwork with a Long Term Evolution (LTE) home network, the method comprising:
   receiving a service request from a 5G capable visiting user device, the home network of the visiting user device comprising an Evolved Packet Core (EPC) network architecture;
   generating Fifth Generation Core (5GC) authentication signaling to authenticate the visiting user device;
   prior to delivering the 5GC authentication signaling to the home network, translating the 5GC authentication signaling into EPC authentication signaling;
   transferring the EPC authentication signaling for delivery to the home network;
   receiving an EPC authentication response from the home network;
   translating the EPC authentication response into a 5GC authentication response; and
   authenticating the visiting user device for service on the 5G visited wireless communication network based on the 5GC authentication response.

2. The method of claim 1 further comprising:
   generating 5GC registration signaling to register the visiting user device for service on the visited wireless communication network;
   prior to delivering the 5GC registration signaling to the home network, translating the 5GC registration signaling into EPC registration signaling;
   transferring the EPC registration signaling for delivery to the home network;
   receiving an EPC registration response from the home network;
   translating the EPC registration response into a 5GC registration response; and
   registering the visiting user device for service on the 5G visited wireless communication network based on the 5GC registration response.

3. The method of claim 2 further comprising:
   generating a 5GC session request to serve the visiting user device on the visited wireless communication network;
   prior to delivering the 5GC session request to the home network, translating the 5GC session request into an EPC session request;
   transferring the EPC session request for delivery to the home network;
   receiving an EPC session response from the home network;
   translating the EPC session response into a 5GC session response; and
   establishing a data session based on the 5GC session response for the visiting user device on the 5G visited wireless communication network.

4. The method of claim 3 further comprising:
   in response to establishing the data session, exchanging user data with the wireless user device; and
   exchanging the user data with the home network.

5. The method of claim 2 further comprising:
   generating a 5GC policy association request to create a policy association for the visiting user device for service on the visited wireless communication network;
   prior to delivering the 5GC policy association request to the home network, translating the 5GC policy association request into an EPC policy association request;
   transferring the EPC policy association request for delivery to the home network;
   receiving an EPC policy association response from the home network;
   translating the EPC policy association response into a 5GC policy association response; and
   creating a policy association for the visiting user device on the 5G visited wireless communication network based on the 5GC policy association response.

6. The method of claim 2 further comprising:
   generating a 5GC voice call request for the visiting user device on the visited wireless communication network;
   prior to delivering the 5GC voice call request to the home network, translating the 5GC voice call request into an EPC voice call request;
   transferring the EPC voice call request for delivery to the home network;
   receiving an EPC voice call response from the home network;
   translating the EPC voice call response into a 5GC voice call response; and
   establishing a voice session based on the 5GC voice call response for the visiting user device on the 5G visited wireless communication network.

7. The method of claim 6 further comprising:
   in response to establishing the voice call session, exchanging voice data with the wireless user device; and
   exchanging the voice data with the home network.

8. A Fifth Generation (5G) visited wireless communication network to interwork with a Long Term Evolution (LTE) home network, the 5G visited wireless communication network comprising:
   Access and Mobility Management Function (AMF) circuitry that:
      receives a service request from a 5G capable visiting user device, the home network of the visiting user device comprising an Evolved Packet Core (EPC) network architecture;
      generates Fifth Generation Core (5GC) authentication signaling to authenticate the visiting user device;
   5GC EPC Interworking Function (5EIWF) circuitry that:
      prior to delivering the 5GC authentication signaling to the home network, translates the 5GC authentication signaling into EPC authentication signaling;
      transfers the EPC authentication signaling for delivery to the home network;
      receives an EPC authentication response from the home network; and
      translates the EPC authentication response into a 5GC authentication response; and
   the AMF circuitry that:
      authenticates the visiting user device for service on the 5G visited wireless communication network based on the 5GC authentication response.

9. The 5G visited wireless communication network of claim 8 wherein:
   the AMF circuitry further:
      generates 5GC registration signaling to register the visiting user device for service on the visited wireless communication network;

the 5EIWF circuitry further:
prior to delivering the 5GC registration signaling to the home network, translates the 5GC registration signaling into EPC registration signaling;
transfers the EPC registration signaling for delivery to the home network;
receives an EPC registration response from the home network;
translates the EPC registration response into a 5GC registration response; and
the AMF circuitry further:
registers the visiting user device for service on the 5G visited wireless communication network based on the 5GC registration response.

10. The 5G visited wireless communication network of claim 9 wherein:
the AMF circuitry further:
generates 5GC session request to serve the visiting user device on the visited wireless communication network;
the 5EIWF circuitry further:
prior to delivering the 5GC session request to the home network, translates the 5GC session request into an EPC session request;
transfers the EPC session request for delivery to the home network;
receives an EPC session response from the home network;
translates the EPC session response into a 5GC session response; and
the AMF circuitry further:
establishes a data session based on the 5GC session response for the visiting user device on the 5G visited wireless communication network.

11. The 5G visited wireless communication network of claim 10 further comprising:
User Plane Function (UPF) circuitry that:
in response to establishing the data session, exchanges user data with the wireless user device; and
exchanges the user data with the home network.

12. The 5G visited wireless communication network of claim 9 wherein:
the AMF circuitry further:
generate a 5GC policy association request to create a policy association for the visiting user device for service on the visited wireless communication network;
the 5EIWF circuitry further:
prior to delivering the 5GC policy association request to the home network, translates the 5GC policy association request into an EPC policy association request;
transfers the EPC policy association request for delivery to the home network;
receives an EPC policy association response from the home network;
translates the EPC policy association response into a 5GC policy association response; and
the AMF circuitry further:
creates a policy association for the visiting user device on the 5G visited wireless communication network based on the 5GC policy association response.

13. The 5G visited wireless communication network of claim 9 wherein:
the AMF circuitry further:
generates a 5GC voice call request for the visiting user device on the visited wireless communication network;
the 5EIWF circuitry further:
prior to delivering the 5GC voice call request to the home network, translates the 5GC voice call request into an EPC voice call request;
transfers the EPC voice call request for delivery to the home network;
receives an EPC voice call response from the home network;
translates the EPC voice call response into a 5GC voice call response; and
the AMF circuitry further:
establishes a voice session based on the 5GC voice call response for the visiting user device on the 5G visited wireless communication network.

14. The 5G visited wireless communication network of claim 13 further comprising:
User Plane Function (UPF) circuitry that:
in response to establishing the voice call session, exchanges voice data with the wireless user device; and
exchanges the voice data with the home network.

15. One or more non-transitory computer-readable storage media having program instructions stored thereon to interwork with a Long Term Evolution (LTE) home network, wherein the program instructions, when executed by a computing system, direct the computing system to perform operations, the operations comprising:
receiving a service request from a 5G capable visiting user device for service on a Fifth Generation (5G) visited wireless communication network, the home network of the visiting user device comprising an Evolved Packet Core (EPC) network architecture;
generating Fifth Generation Core (5GC) authentication signaling to authenticate the visiting user device;
prior to delivering the 5GC authentication signaling to the home network, translating the 5GC authentication signaling into EPC authentication signaling;
transferring the EPC authentication signaling for delivery to the home network;
receiving an EPC authentication response from the home network;
translating the EPC authentication response into a 5GC authentication response; and
authenticating the visiting user device for service on the 5G visited wireless communication network based on the 5GC authentication response.

16. The non-transitory computer-readable storage media of claim 15 wherein the operations further comprise:
generating 5GC registration signaling to register the visiting user device for service on the visited wireless communication network;
prior to delivering the 5GC registration signaling to the home network, translating the 5GC registration signaling into EPC registration signaling;
transferring the EPC registration signaling for delivery to the home network;
receiving an EPC registration response from the home network;
translating the EPC registration response into a 5GC registration response; and
registering the visiting user device for service on the 5G visited wireless communication network based on the 5GC registration response.

17. The non-transitory computer-readable storage media of claim 16 wherein the operations further comprise:
generating a 5GC session request to serve the visiting user device on the visited wireless communication network;
prior to delivering the 5GC session request to the home network, translating the 5GC session request into an EPC session request;
transferring the EPC session request for delivery to the home network;
receiving an EPC session response from the home network;
translating the EPC session response into a 5GC session response; and
establishing a data session based on the 5GC session response for the visiting user device on the 5G visited wireless communication network.

18. The non-transitory computer-readable storage media of claim 17 wherein the operations further comprise:
in response to establishing the data session, exchanging user data with the wireless user device; and
exchanging the user data with the home network.

19. The non-transitory computer-readable storage media of claim 16 wherein the operations further comprise:
generating a 5GC policy association request to create a policy association for the visiting user device for service on the visited wireless communication network;
prior to delivering the 5GC policy association request to the home network, translating the 5GC policy association request into an EPC policy association request;
transferring the EPC policy association request for delivery to the home network;
receiving an EPC policy association response from the home network;
translating the EPC policy association response into a 5GC policy association response; and
creating a policy association for the visiting user device on the 5G visited wireless communication network based on the 5GC policy association response.

20. The non-transitory computer-readable storage media of claim 16 wherein the operations further comprise:
generating a 5GC voice call request for the visiting user device on the visited wireless communication network;
prior to delivering the 5GC voice call request to the home network, translating the 5GC voice call request into an EPC voice call request;
transferring the EPC voice call request for delivery to the home network;
receiving an EPC voice call response from the home network;
translating the EPC voice call response into a 5GC voice call response; and
establishing a voice session based on the 5GC voice call response for the visiting user device on the 5G visited wireless communication network.

* * * * *